(12) United States Patent
McKenna et al.

(10) Patent No.: US 10,733,668 B2
(45) Date of Patent: Aug. 4, 2020

(54) MULTI-LAYER MACHINE LEARNING CLASSIFIER

(71) Applicant: PointPredictive Inc., San Diego, CA (US)

(72) Inventors: Frank J. McKenna, La Jolla, CA (US); Timothy J. Grace, Encinitas, CA (US); Gregory Gancarz, San Diego, CA (US); Michael J. Kennedy, Encinitas, CA (US)

(73) Assignee: PointPredictive Inc., San Diego, CA (US)

( * ) Notice: Subject to any disclaimer, the term of this patent is extended or adjusted under 35 U.S.C. 154(b) by 0 days.

(21) Appl. No.: 16/261,295

(22) Filed: Jan. 29, 2019

(65) Prior Publication Data

US 2019/0236695 A1 Aug. 1, 2019

Related U.S. Application Data

(60) Provisional application No. 62/624,076, filed on Jan. 30, 2018, provisional application No. 62/624,078, filed on Jan. 30, 2018.

(51) Int. Cl.
*G06Q 40/00* (2012.01)
*G06Q 40/02* (2012.01)
*G06N 20/00* (2019.01)
*G06F 21/57* (2013.01)
*G06N 20/20* (2019.01)
(Continued)

(52) U.S. Cl.
CPC ......... *G06Q 40/025* (2013.01); *G06F 21/577* (2013.01); *G06N 7/005* (2013.01); *G06N 20/00* (2019.01); *G06N 20/20* (2019.01); *G06F 3/013* (2013.01); *G06F 2221/034* (2013.01); *G06N 3/04* (2013.01); *G06N 3/08* (2013.01); *G10L 15/22* (2013.01); *G10L 2015/223* (2013.01)

(58) Field of Classification Search
CPC .................................................. G06Q 40/025
USPC .......................................................... 706/12
See application file for complete search history.

(56) References Cited

U.S. PATENT DOCUMENTS 5,745,654 A 4/1998 Titan
5,819,226 A 10/1998 Gopinathan et al.
(Continued)

OTHER PUBLICATIONS

McKenna et al., "Risk-Based Machine Learning Classifier", U.S. Appl. No. 16/261,304, filed Jan. 29, 2019.
(Continued)

*Primary Examiner* — Hien D Khuu
(74) *Attorney, Agent, or Firm* — Kilpatrick Townsend & Stockton LLP

(57) ABSTRACT

The present disclosure relates generally to a multi-layer fraud identification and risk analysis system. For example, the system may receive application data from a first borrower user, apply application data to one or more machine learning (ML) models, and receive a first score based at least in part upon output of the ML model that is associated with the first borrower user. The system may aggregate scores associated with multiple borrower users to a cumulative dealer user level. The aggregated first scores associated with the dealer user, as well as other corresponding application data, may be provided as input to a second ML model. Output from the second ML model may be associated with the dealer user as a second score.

18 Claims, 14 Drawing Sheets

(51) Int. Cl.
*G06N 7/00* (2006.01)
*G06F 3/01* (2006.01)
*G06N 3/04* (2006.01)
*G06N 3/08* (2006.01)
*G10L 15/22* (2006.01)

(56) References Cited

U.S. PATENT DOCUMENTS

| | | |
|---|---|---|
| 7,587,348 B2 * | 9/2009 | Liao ............... G06Q 20/10 705/35 |
| 7,668,769 B2 | 2/2010 | Baker et al. |
| 7,908,210 B2 | 3/2011 | Huber et al. |
| 8,121,920 B2 | 2/2012 | Liao et al. |
| 8,567,669 B2 | 10/2013 | Griegel et al. |
| 10,127,234 B1 | 11/2018 | Krishnan et al. |
| 10,424,011 B2 | 9/2019 | Biafore et al. |
| 10,467,690 B2 | 11/2019 | Forrester et al. |
| 10,586,280 B2 | 3/2020 | McKenna et al. |
| 2011/0173116 A1 * | 7/2011 | Yan ............... G06Q 10/067 705/38 |
| 2011/0238566 A1 | 9/2011 | Santos |
| 2014/0081832 A1 * | 3/2014 | Merrill ............... G06Q 40/02 705/38 |
| 2015/0032598 A1 | 1/2015 | Fleming et al. |
| 2016/0048766 A1 | 2/2016 | Mcmahon et al. |
| 2016/0203490 A1 | 7/2016 | Gupta et al. |
| 2017/0178063 A1 | 6/2017 | Dhandapani et al. |
| 2018/0113742 A1 | 4/2018 | Chung et al. |
| 2018/0122004 A1 | 5/2018 | Stewart |
| 2018/0300398 A1 | 10/2018 | Moeller-bertram et al. |
| 2019/0130216 A1 | 5/2019 | Tomioka et al. |
| 2019/0279363 A1 | 9/2019 | Steigauf et al. |

OTHER PUBLICATIONS

McKenna et al., "Multi-Layer Machine Learning Classifier With Correlative Score", U.S. Appl. No. 16/261,320, filed Jan. 29, 2019.
First Action Interview Pilot Program Pre-Interview Communication for U.S Appl. No. 16/261,304 dated Jul. 18, 2019, 6 pages.
First Action Interview Pilot Program Pre-Interview Communication for U.S Appl. No. 16/261,320 dated Jul. 17, 2019, 4 pages.
Kou et al., "Mcdm Approach to Evaluating Bank Loan Default Models", Technological and Economic Development of Economy, vol. 20, No. 2, 2014, pp. 292-311.
Ngai et al., "The Application of Data Mining Techniques in Financial Fraud Detection: A Classification Framework and an Academic Review of Literature", Decision Support Systems, vol. 50, Issue 3, 2011, pp. 559-569.
Rodriques et al., "Auto Claim Fraud Detection Using Multi Classifier System", Journal of Computer Science & Information Technology, 2014, pp. 37-44.
U.S. Appl. No. 16/261,304, "Notice of Allowance", dated Oct. 28, 2019, 19 pages.
U.S. Appl. No. 16/261,320, "Non-Final Office Action", dated Nov. 19, 2019, 8 pages.
U.S. Appl. No. 16/261,304, "Notice of Allowability", dated Jan. 23, 2020, 5 pages.
U.S. Appl. No. 16/261,320, "Notice of Allowance", dated Apr. 10, 2020, 6 pages.

* cited by examiner

700

| Application Information | Score |
|---|---|
| Application ID: 1234567<br>Location: MIAMI, FL<br>Loan Amount: $30,140<br>Loan Term: 72 months<br>Car Make: ACME<br>Car Model: M35<br>Dealer ID: 4042 | 998 |
| | Risk Level |
| | High |

Top Risk Reasons Detected

⚠ Fraud Ring Risk: Car Dealer is Located Significant Distance From Borrower Address ⚠ Dealer Risk: Dealer's Fraud Risk Score is High ⚠ Collateral Risk: Auto Type is High Risk of Fraud

Recommended Actions
- Check Identity Risk with Drivers License Check and Perform Borrower Verification Call
- Perform Borrower Verification Call to Re-verify Information
- Verify collateral value against a standard range, this vehicle may be priced higher than normal

| Borrower Attributes | | Loan Attributes | | Dealer Attributes | |
|---|---|---|---|---|---|
| Credit Score | 650 | Loan Amount | $30,140 | Dealer Name | BETA CARS |
| Income | $10,417/ month | LTV | 100.00% | Dealer Match | Yes |
| Employer | SELF EMPLOYEE | PITI | 35.00% | Dealer Score | 978 |
| Self Employed | Yes | DTI | 49.00% | Dealer Risk Level | High |
| Co Borrower | No | Cash Down | $0 | Dealer Volume | 5196 |
| Age of Oldest Trade | 27 months | Car Purchased | 2009 ACME | Average Credit Score | 684 |
| High Credit Amount | $1,000 | Purchased Price | $30,140 | Risk Reported In Consortium | Yes |

FIG. 7

Dealer Information

Dealer ID: 4061
Dealer Name: CARS OF MAIN STREET
Street Address: 765 MAIN STREET, NORTH, CA 92408
Phone: (555) 444-0700
Volume: 250

Score

997

Risk Level

High

Top Risk Reasons Detected

⚠ This Dealer Has a Significantly Higher Fraud Rate than Average

⚠ This Dealer Has a Significantly Higher Early Payment Default Rate Average

⚠ This Dealer's Application Fraud Scores are Significantly Higher Than Average

| Dealer Scores/Key Metrics | | Key Dealer Ratios | | Known Performance | |
|---|---|---|---|---|---|
| Average Fraud Score | 765 | Average LTV | 111.85% | Fraud Reported in Network | Yes |
| Average Credit Score | 688 | Average DTI | 39.58% | Total Reported Frauds Loans | 18 |
| Average Amount Financed | $18,227.81 | Average Income | $5,758 | Total Reported EPD Loans | 24 |
| Average Down Payment % | 7.42% | Average Loan Term | 66.72% | Total Fraud Rate | 1.50% |
| Total # of Apps | 250 | Common Employer Phone % | N/A | Total EPD Rate | 2.80% |
| Approved % | 78.61% | Coborrower % | 36.48% | Fraud Risk Level | High |
| Declined % | 21.39% | Velocity | N/A | EPD Risk Level | High |
| % Booked Loans | 74.55% | Average APR | 2.33% | Consumer Review Rating | High |

FIG. 10

MULTI-LAYER MACHINE LEARNING CLASSIFIER

CROSS-REFERENCE TO RELATED APPLICATIONS

The present application is a non-provisional application of and claims priority to U.S. Provisional No. 62/624,076 and U.S. Provisional No. 62/624,078, both filed on Jan. 30, 2018, the entire contents of which are herein incorporated by reference for all purposes.

This application is also related to U.S. patent application Ser. No. 16/261,304, filed concurrently herewith, entitled "RISK-BASED MACHINE LEARNING CLASSIFIER," and U.S. patent application Ser. No. 16/261,320, filed concurrently herewith, entitled "MULTI-LAYER MACHINE LEARNING CLASSIFIER WITH CORRELATIVE SCORE," the full disclosures of which are incorporated herein by reference for all purposes.

BACKGROUND

The present application is generally related to improving electronic authentication and reducing risk of electronic transmissions between multiple sources using multiple communication networks.

Fraud can be prevalent in any context or industry. Customary authentication techniques may rely on face-to-face interactions to confirm an identity of the person. When these authentication requirements are implemented in an electronic environment, electronic authentication becomes an even more difficult problem to solve. Improved authentication techniques are required.

BRIEF SUMMARY

One aspect of the present disclosure relates to systems and methods for computing a score. The method may comprise, for example, receiving, by a computer system, an application object for an application, wherein the application object includes application data associated with a first borrower user device, and wherein the application is initiated upon receiving a request from the first borrower user device at a second dealer user device or a third lender user device; determining a segment associated with the application data; upon determining that the segment is a particular type of segment: generating, by the computer system, one or more input features associated with the application based upon the application data; determining, by the computer system, an output by applying the one or more input features associated with the application to a trained machine learning (ML) model; scaling, by the computer system, the output of the trained ML model to a range of application scores to determine the application score for the application; determining, by the computer system, one or more reason codes for the application based at least in part on the application score for the application; and determining, by the computer system, one or more actions for the application based at least in part on the application score for the application; and providing, by the computer system, the application score, the one or more reason codes, and the one or more actions to the second dealer user device or the third lender user device.

Another aspect of the present disclosure relates to systems and methods for computing a score. The method may comprise, for example, receiving, by a computer system, a plurality of scores corresponding with a plurality of applications, wherein the plurality of applications includes application data associated with a plurality of borrower user devices, wherein the plurality of scores are output from a first trained machine learning (ML) model, and wherein the plurality of applications are exchanged between the plurality of borrower user devices and a dealer user device; generating, by the computer system, one or more input features associated with the plurality of applications; determining, by the computer system, a second score associated with the plurality of scores, wherein the second score corresponds with a collective risk associated with the dealer user device, and wherein determining the second score comprises applying the one or more input features and the plurality of scores associated with the plurality of applications to a second trained ML model; determining, by the computer system, one or more reason codes for the plurality of applications based at least in part on the second score; determining, by the computer system, one or more actions for the plurality of applications based at least in part on the second score; and providing, by the computer system, the second score, the one or more reason codes, and the one or more actions to the dealer user device or a lender user device.

Another aspect of the present disclosure relates to systems and methods for computing a score. The method may comprise, for example, receiving, by a computer system, a plurality of first scores for a plurality of applications, wherein the plurality of applications include application data associated with a plurality of borrower user devices, wherein the plurality of applications are associated with a dealer user device, and wherein the plurality of first scores are output from a first trained machine learning (ML) model; receiving, by the computer system, a request for the second level score from a lender user device; determining, by the computer system, a correlative score for each of the plurality of applications, the correlative score for each of the plurality of applications identifying links between dealer user devices and lender user devices; generating, by the computer system, one or more input features associated with the applications; determining, by the computer system, a first output by applying the one or more input features and the correlative score for each of the of the plurality of applications to a second trained ML model, wherein the first output corresponds with the dealer user device and the lender user device associated with the request; scaling the first output of the second trained ML model to a range of second level scores to determine the second level score associated with the dealer user device and the lender user device; and providing, by the computer system, the second level score to the lender user device.

BRIEF DESCRIPTION OF THE DRAWINGS

Illustrative embodiments of the present disclosure are described in detail below with reference to the following figures.

FIG. 7 illustrates a report for indicating a score according to an embodiment of the disclosure.

FIG. 10 illustrates a report for indicating a score according to an embodiment of the disclosure.

DETAILED DESCRIPTION

Figure 1:
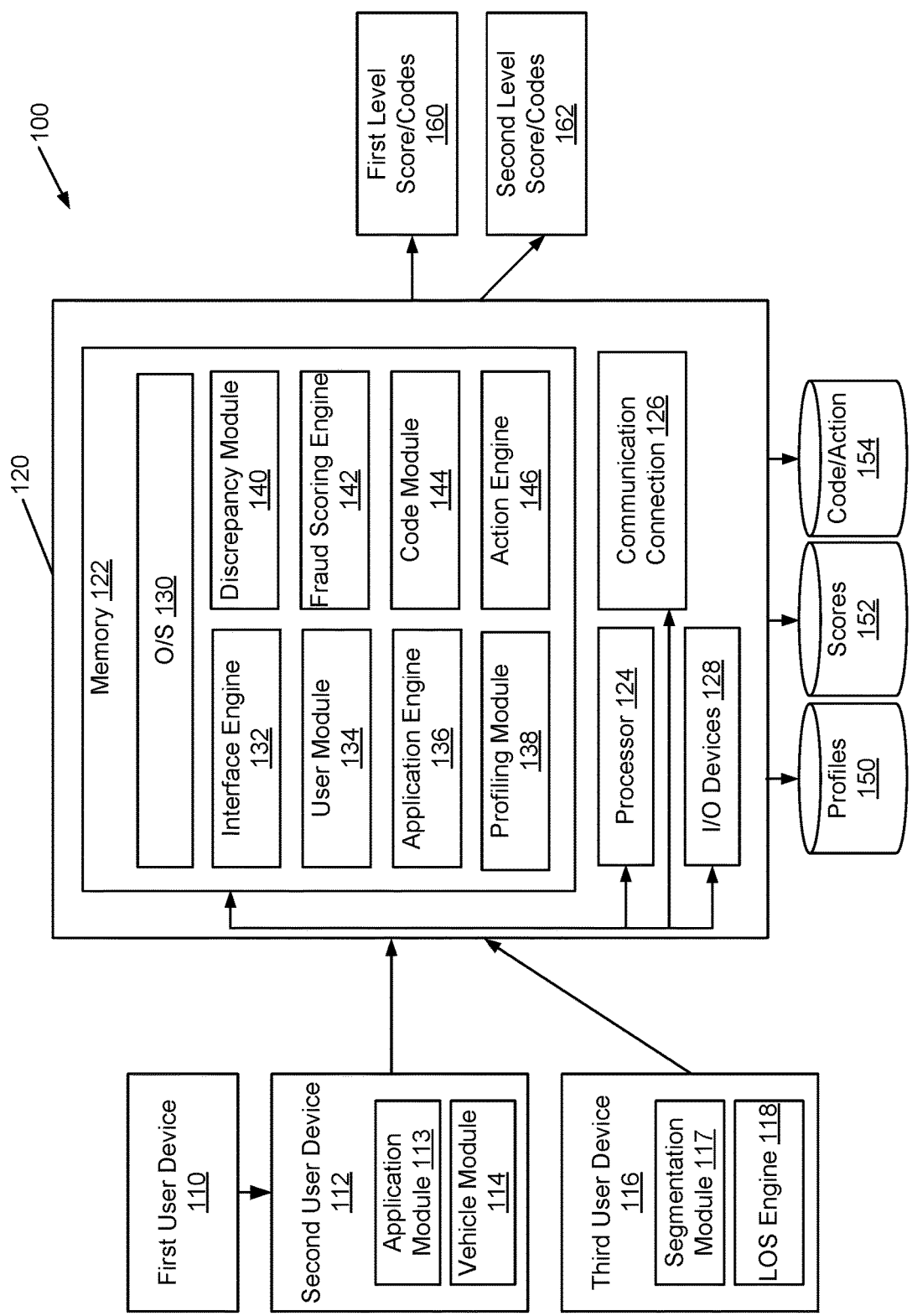
FIG. 1 illustrates a distributed system for fraud detection according to an embodiment of the disclosure.

In the following description, various embodiments will be described. It should be apparent to one skilled in the art that embodiments may be practiced without specific details, which may have been admitted or simplified in order to not obscure the embodiment described.

Embodiments of the present disclosure are directed to, among other things, a risk-based fraud identification and analysis system. For example, the system may receive application data from a first borrower user, determine a segment associated with the application data, apply application data, in part, to one or more machine learning (ML) models, and receive a first score based at least in part upon output of the ML model. The first score may be associated with the first borrower user. The system may combine multiple scores associated with borrower users to a second level, which may correspond with a dealer user. The combined first scores may be provided, in part, as input to a second ML model. Output from the second ML model may be associated with the dealer user as a second score. The system may determine the first score(s) and/or second scores using one or more ML models. In some examples, the client device that communicates with the system (e.g., that determines the scores, etc.) may not correspond with the borrower user or dealer user, and/or may correspond with a third party device (e.g., a lender user, etc.).

In some examples, the application scores may correspond with reason codes and/or suggested actions to mitigate risk or identify fraud associated with the application data. For example, a first score may correspond with an increased likelihood associated with a first type of fraud. The reason codes associated with this first score may identify this particular first type of fraud in a display of the user interface. The first score may also correspond with suggested actions to mitigate some of the risk, including requesting a second form of authentication or receiving additional data from a third-party entity.

The system may implement multiple machine learning (ML) models. For example, a first ML model may receive application data from a borrower user device. In some examples, the application data may correspond with a segment and only application data corresponding with a particular segment may be provided to the first ML model. The system may correlate the application data to a training data set or, in the alternative, may apply the application data to a trained, first ML model.

The second ML model may receive the output from the first ML model as input. For example, upon receiving the output from the first ML model and/or application data from one or more borrower user devices, the system may apply the data to a second ML model to determine a second score. The first scores may be used as a training data set for the second ML model or, in some examples, may be provided to a previously-trained second ML model as input. The output from the second ML model may indicate signals of fraud and/or predict the type of fraud associated with a particular dealer user device and the corresponding output from the first ML model.

In some examples, the application data or output from the first ML model may be combined across multiple dealer users. For example, individual application data from a first borrower user may identify a dealer user and individual application data from a second borrower user may identify the same dealer user. The plurality of application data may be provided as input to an ML model to determine a score associated with the same dealer user. In some examples, the same dealer user may correspond with different addresses or with different dealer identifiers. In some examples, the system may normalize or transform dealer user information so that the application data may be combined, including when the intention is to associate the application data with the same entity. In some examples, the combined data may be associated with a particular dealer user and the second score from the second ML model.

The system may provide output to a user interface, including one or more scores, reason codes, or actions. For example, the system may provide a first score associated with a first borrower user and/or a second score associated with a dealer user. Each of the corresponding scores may be provided with additional information, including the borrower user, user identifiers, reason codes, or suggested actions, for example, to mitigate risk or identify fraud associated with the application data.

In some examples, a lender user device may request a score associated with a dealer user. The system may determine a correlative score (e.g., one or zero, or a value in a range of correlative scores, etc.) that links dealer user devices with lender user devices. When the correlative score exceeds a threshold, a correlation between a particular dealer user and lender user may be identified. One or more input features and the correlative score may be provided to a trained ML model and the output from the trained ML model may be scaled to a range of scores to determine the relative risk associated with the particular dealer user and lender user that requested the score. Illustrations and examples of this output to the user interface are provided throughout the disclosure.

Embodiments of the application provide numerous improvements over conventional systems. For example, application data from a borrower user may be provided to a lender user in conventional systems without implementing a fraud analysis or risk assessment. This disclosure may implement fraud analysis and, prior to providing the application data to the lender user, the processing may identify a signal of fraud and/or predict a type of fraud that the borrower user may eventually commit. By identifying fraud early in the process, the application data may not be transmitted to the lender user device, which can create more efficient processing and fewer electronic communications over a communication network. As such, the present disclosure creates a unique computing system with modules and engines that improve on conventional systems.

Additional improvements to conventional systems may be identified from a borrower user perspective. For example, by identifying a signal of fraud or potential risk associated with the application data, the borrower user may provide a second authentication or additional data to support information included in the application data. This additional data may be provided in association with the beginning of the application process (e.g., prior to approval of the application by the lender user). This may create more efficient electronic processing by encouraging additional receipt of data early in the authentication process, and in some examples, may prevent future transactions for fraud from occurring, which can further reduce or eliminate unnecessary processing to fix the fraudulent behavior.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will be described in more detail below in the following specification, claims, and accompanying drawings.

FIG. 1 illustrates a distributed system for fraud detection according to an embodiment of the disclosure. In example 100, a distributed system for identifying fraud is illustrated, including a first borrower user device 110, a second dealer user device 112, a third lender user device 116, and a fraud detection computer system 120. In some examples, devices illustrated herein may comprise a mixture of physical and cloud computing components. Each of these devices may transmit electronic messages via a communication network. Names of these and other computing devices are provided for illustrative purposes and should not limit implementations of the disclosure.

The first borrower user device 110, second dealer user device 112, and third lender user device 116 may display content received from one or more other computer systems, and may support various types of user interactions with the content. These devices may include mobile or non-mobile devices such as smartphones, tablet computers, personal digital assistants, and wearable computing devices. Such devices may run a variety of operating systems and may be enabled for Internet, e-mail, short message service (SMS), Bluetooth®, mobile radiofrequency identification (M-RFID), and/or other communication protocols. These devices may be general purpose personal computers or special-purpose computing devices including, by way of example, personal computers, laptop computers, workstation computers, projection devices, and interactive room display systems. Additionally, first borrower user device 110, second dealer user device 112, and third lender user device 116 may be any other electronic devices, such as a thin-client computers, an Internet-enabled gaming systems, business or home appliances, and/or a personal messaging devices, capable of communicating over network(s).

In different contexts, first borrower user device 110, second dealer user device 112, and third lender user device 116 may correspond to different types of specialized devices, for example, a borrower user device, a dealer user device, and a lender user device, respectively. In some embodiments, one or more of these devices may operate in the same physical location, such as an automotive dealership or a finance center. In such cases, the devices may contain components that support direct communications with other nearby devices, such as wireless transceivers and wireless communications interfaces, Ethernet sockets or other Local Area Network (LAN) interfaces, etc. In other implementations, these devices need not be used at the same location, but may be used in remote geographic locations in which each device may use security features and/or specialized hardware (e.g., hardware-accelerated SSL and HTTPS. WS-Security, firewalls, etc.) to communicate with the fraud detection computer system 120 and/or other remotely located user devices.

The first borrower user device 110, second dealer user device 112, and third lender user device 116 may comprise one or more applications that may allow these devices to interact with other computers or devices on a network, including cloud-based software services. The application may be capable of handling requests from many users and posting various webpages. In some examples, the application may help receive and transmit application data or other information to various devices on the network.

The first borrower user device 110, second dealer user device 112, and third lender user device 116 may include at least one memory and one or more processing units that may be implemented as hardware, computer executable instructions, firmware, or combinations thereof. The computer executable instruction or firmware implementations of the processor may include computer executable machine executable instructions written in any suitable programming language to perform the various functions described herein. These user devices may also include geolocation devices communicating with a global positioning system (GPS) device for providing or recording geographic location information associated with the user devices.

The memory may store program instructions that are loadable and executable on processors of the user devices, as well as data generated during execution of these programs. Depending on the configuration and type of user device, the memory may be volatile (e.g., random access memory (RAM), etc.) and/or non-volatile (e.g., read-only memory (ROM), flash memory, etc.). The user devices may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory may include multiple different types of memory, such as static random access memory (SRAM), dynamic random access memory (DRAM), or ROM.

The first borrower user device 110, second dealer user device 112, third lender user device 116, and the fraud detection computer system 120 may communicate via one or more networks, including private or public networks. Some examples of networks may include cable networks, the Internet, wireless networks, cellular networks, and the like.

As illustrated in FIG. 1, the first borrower user device 110 may be configured to provide application data for a variety of purposes. For example, the application data may be intended to identify one or more characteristics of the borrower user, including name, address, income, employment history, credit score, or other information that may support an identification for authentication of the borrower user. In some examples, the application may also support a request for a loan, lease, or purchase of an item from a dealer user. In such examples, the application may be submitted for the borrower user by one or more devices, including the borrower user device, the dealer user device, or the lender user device. The loan, lease, or purchase the item (e.g., a vehicle) may be based at least in part on the price of the item, interest rate associate the loan, or other factors that may determine a monthly repayment amount between the borrower user and the lender user.

The application data may correspond with one or more segments as well. For example, the one or more segments may group the applications according to characteristics correlating with the application, borrower user, dealer user, or lender user. In a sample illustration, a first segment may correspond with good credit and a second segment may correspond with poor credit (e.g., in comparing a borrower user credit score with a credit threshold, etc.). In another illustration, a first segment may correspond with a franchise dealer user that accepts the application data from the first borrower user device 110, a second segment may correspond with a non-franchise dealer user that accepts the application data from the first borrower user device 110, and a third segment may correspond with an independent dealer user that accepts the application data from the first borrower user device 110.

The application data may also correspond with characteristics of the first borrower user device 110. For example, the application data may include a user device identifier, as described herein, or an identification of a communication network utilized by the user device to communicate with other devices.

The second dealer user device 112 may correspond with a dealer user and be configured to receive and transmit application and vehicle data to various computing devices. The second dealer user device 112 may comprise an application module 113 and a vehicle module 114.

The application module 113 may be configured to receive application data. The application data may be transmitted via a network from a first borrower user device 110 or, in some examples, may be provided directly at the second dealer user device 112 via a user interface and without a network transmission. The application module 113 may provide a template to receive application data corresponding with a variety of characteristics associated with a borrower user. In some examples, the application module 113 may be implemented with the third lender user device 116 without diverting from the essence of the disclosure.

The application module 113 may be configured to transmit application data to the fraud detection computer system 120. The application data may be encoded in electronic message and transmitted via a network to an application programming interface (API) associated with the fraud detection computer system 120. Additional details regarding the transmission of this data is provided with FIG. 3.

The second dealer user device 112 may also comprise a vehicle module 114. The vehicle module 114 may be configured to receive and provide information associated with vehicles. For example, the dealer user may receive vehicle information, including make, model, vehicle identification number (VIN), price, and other relevant information to store in a data store of vehicles. The data store of vehicles may be managed by the dealer user to maintain data for an inventory of vehicles available to the dealer user. In some examples, the dealer user may offer the vehicles identified in the data store of vehicles with the vehicle module 114 to the borrower user in exchange for funding provided by the borrower user. The application data may be used, in part, to secure the funding in exchange for the vehicle.

The third lender user device 116 may correspond with a lender user and be configured to receive and transmit application, segmentation, and third-party information to various computing devices. The third lender user device 116 may comprise a segmentation module 117 and an LOS engine 118.

The segmentation module 117 may be configured to determine a segment corresponding with an application. For example, the segment may correspond with the borrower user to identify a characteristic associated with the borrower user or the borrower user device. As a sample illustration, this may include a prime credit score or a subprime credit score. In other examples, the segment may correspond with the dealer user or the dealer user device. As a sample illustration, the segment may include a franchise dealer or a non-franchise or independent dealer.

The segmentation module 117 may be configured to determine segmentation information to an application. For example, the third lender user device 116 may receive application data from a first user device 110 or a second user device 112. The segmentation module 117 may identify the characteristic associated with the application based at least in part on application data received from these user devices. The segmentation module 117 may be configured to add the characteristic as a segment corresponding with additional application data and store the updated application data in the profile data store 150 for further processing.

The third lender user device 116 may also comprise a LOS module 118. The loan origination system (LOS) module 118 may be configured to generate an application object with application data. Additional information associated with the loan origination module 118 is provided with FIG. 5.

The fraud detection computer system 120 may correspond with any computing devices or servers on a distributed network, including processing units 124 that communicate with a number of peripheral subsystems via a bus subsystem. These peripheral subsystems may include memory 122, a communications connection 126, and/or input/output devices 128.

The memory 122 may start program instructions that are loadable and executable on processor 124, as well as data generated during the execution of these programs. Depending on the configuration and type of fraud detection computer system 120, the memory may be volatile (such as random access memory (RAM)) and/or non-volatile (such as read-only memory (ROM), flash memory, etc.). The fraud detection computer system 120 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the fraud detection computer system 120. In some implementations, the memory may include multiple different types of memory, such as SRAM, DRAM, or ROM.

The memory 122 is an example of computer readable storage media. For example, computer storage media may include volatile or nonvolatile, removable or non-removable media, implemented in any methodology or technology for storage of information such that computer readable instructions, data structures, program modules, or other data. Additional types of memory computer storage media may include PRAM. SRAM, DRAM, RAM. ROM, EEPROM, flash memory or other memory technology. CD-ROM, DVD or other optical storage, magnetic cassettes, magnetic tape, magnetic disk storage or other magnetic storage devices, or any other medium which can be used to store the desired information and which can be accessed by the fraud detection computer system 120. Combinations of any of the above should also be included within the scope of computer-readable media.

The communications connection 126 may allow the fraud detection computer system 120 to communicate with a data store, server, or other device on the network. The fraud detection computer system 120 may also include input/output devices 128, such as a keyboard, a mouse, a voice input device, a display, speakers, a printer, and the like.

Reviewing the contents of memory 122 in more detail, the memory 122 may comprise an operating system 130, an interface engine 132, a user module 134, an application engine 136, a profiling module 138, a discrepancy module 140, a fraud scoring engine 142, a code module 144, and/or an action engine 146. The fraud detection computer system 120 may receive and store data in various data stores, including a profiles data store 150, scores data store 152, and code/action data store 154. The modules and engines described herein may be software modules, hardware modules, or a combination thereof. If the modules are software modules, the modules will be embodied in a non-transitory computer readable medium and processed by a processor with computer systems described herein.

The fraud detection computer system 120 may comprise an interface engine 132. The interface engine 132 may be configured to receive application data and/or transmit scores, codes, and potential actions. In some examples, the interface engine 132 may implement an application programming interface (API) to receive or transmit data.

The fraud detection computer system 120 may comprise a user module 134. The user module 134 may be configured to identify one or more users or user devices associated with the fraud detection computer system 120. Each of the users or user devices may be associated with a user identifier and a plurality of data stored with the profiles data store 150.

The fraud detection computer system 120 may comprise an application engine 136. The application engine 136 may be configured to receive application data associated with an application object. The application data may be received from a second user device 112 or a third user device 116 via a network medication message, API transmission, or other methods described herein.

The application engine 136 may be configured to associate a time with receiving the application data. For example, a plurality of applications may be received from a first lender user device associated with a borrower user within a predetermined time range (e.g., under one minute). The application engine 136 may be configured to identify the plurality of applications from a source (e.g., the borrower or dealer user device) or to a destination (e.g., the lender user device) within the time range. In some examples, the application engine 136 may also be configured to identify an item above a price range identified with application data in addition to the time information. These features of the application may help identify an increased likelihood of fraud (e.g., fifteen applications for expensive cars within five minutes may identify a fraud ring, etc.).

The application engine 136 may also be configured to store historical application data and any corresponding risk occurring in association with the application. For example, an application may be submitted and approved by the lender user device, and the lender user device may provide funds in response to approving the application for a borrower user. The indication of approval as well as the application data and/or an originating dealer user of the application may be stored in the profiles data store 150. Subsequent interactions with the borrower may also be identified, including non-repayment of a loan resulting from fraudulent information in an application (e.g., fraudulent reporting of a salary of the borrower user, etc.). The profiles data store 150 may identify input features from the application data and correlate the input features with an increased likelihood of fraud.

The application engine 136 may also correlate the input features from application data with an increased application score for future applications that match input features of the fraudulent borrower user. For subsequent applications that are received by the fraud detection computer system 120, the greater application score corresponding with a higher likelihood of fraud may correspond with this historical application data and identified non-repayment of the loan originating from the fraudulent application data (e.g., stored and matched with the profiles data store 150).

The application engine 136 may be configured to apply or adjust a weight to historical application data or other input features. For example, application data associated with applications that occur within a predetermined time range may be weighted higher than application data that occurs outside of the predetermined time range. As a sample illustration, application data used to determine a second level score for a dealer user device may weight input features of applications associated with fraud within the past year as having a greater effect on the second level score than applications associated with fraud that occurred greater than a year from a current date. In this example, a dealer user device may correspond with a higher likelihood of fraud when fraudulent applications are submitted to a lender user device more recently than when the fraudulent applications were submitted historically (e.g., greater than a predetermined time range).

The application engine 136 may be configured to apply or adjust a weight to input features associated with a segment. The weights may be adjusted while training of the ML model. In some examples, the weights may be adjusted to correspond with a risk profile of a borrower user, dealer user, or lender user.

The application engine 136 may be configured to adjust the predetermined time range based at least in part on a lender user throughput capacity of applications approved for a loan. For example, a smaller lender user may process a given number of applications over a longer period time when the same number of applications can be processed by a larger lender user. As a sample illustration, a smaller lender user may process twenty applications in two months and a larger lender user may process twenty applications in one week. The application engine 136 may adjust the predetermined time range for the smaller lender user (e.g., based on throughput, based on applications received, etc.) to a greater number than the predetermined time range for the larger lender user. The greater time range for the smaller lender user may allow the fraud detection computer system 120 to receive a comparable sample of application data that may help identify a likelihood of fraud or pattern of fraud with applications received by each lender user, irrespective of the throughput size of the lender user.

The fraud detection computer system 120 may comprise a profiling module 138. The profiling module 138 may be configured to determine a profile of a borrower user or a dealer user. The profile may correspond with one or more characteristics of the user, including income, employment, identity, or the like. In some examples, the profiling module 138 may store any instance of fraud associated with the user device in the profile data store 150.

The profiling module 138 may also be configured to determine one or more segments of the user. A segment may be determined from application data and/or by comparing application data with a predetermined threshold associated with each segment. As a sample illustration, one or more segments may include prime, subprime, or nonprime credit or, for example, franchise or independent dealer types. A borrower user may provide application data that includes a credit score greater than 700. The profiling module 138 may be configured to, for example, assign the prime segment to any credit score greater than 700 (e.g., predetermined threshold for credit scores). In this illustration, the profiling module 138 may identify the borrower user as corresponding with the prime segment.

The profiling module 138 may also be configured to receive a request for a second level score from a third lender user device 116 and identify historical data associated with dealer user devices that have interacted with the third lender user device 116. In some examples, the second level score may correspond with a particular dealer user device.

The profiling module 138 may also be configured to determine a correlative score for each of the plurality of applications. The correlative score (e.g., one or zero, or a value in a range of correlative scores, etc.) that links dealer user devices with lender user devices identified in the historical data. When the correlative score exceeds a threshold (e.g., 0.5, etc.), a correlation between a particular dealer user and lender user may be identified. One or more input features and the correlative score may be provided to a trained ML model and the output from the trained ML model may be scaled to a range of scores to determine the relative risk associated with the particular dealer user and lender user that requested the score.

The profiling module 138 may also be configured to identify a second dealer user. For example, when the correlative score fails to exceed the threshold, a second dealer user may be identified with a greater correlative score associated with the lender user. The application data corresponding with the second dealer user and lender user may be used to identify a second level score in response to a request from the lender user device. In some examples, the second dealer user may share one or more attributes with the first dealer user (e.g., similar locations, similar borrowers, etc.) and may be identified to determine a relative risk to the lender user, despite an absence of application data associated with the first dealer user and the lender user device.

The profiling module 138 may also be configured to determine and/or adjust weights of input features corresponding with input to the ML model. In some examples, the importance of applications received from a specific dealer user associated with a lender user or other nearby similar dealer users may be increased while the importance of all other applications may be decreased. The determination of the weights may correspond with links between the dealer user in the lender user (e.g., historical applications, current applications, a comparison between a particular dealer user and other dealer users in relation to the lender user, etc.).

The profiling module 138 may also be configured to determine one or more attributes of the lender user. In some examples, the attributes of the lender user may correspond with input features provided to the ML model. These attributes may distinguish the lender user from other lenders that receive application data from a particular dealer user.

The fraud detection computer system 120 may comprise a discrepancy module 140. The discrepancy module 140 may be configured to determine differences and discrepancies between information provided with the application as application data and threshold values associated with a standard user profile (e.g., from a third party data source, from consortium data, etc.). For example, a first standard user profile may correspond with a combination of a particular career in a particular location may correspond with a particular salary range. When the application data asserts a different salary that falls outside of the salary range, the discrepancy module 140 may be configured to identify that discrepancy between the provided data and the expected data associated with the first standard user profile. In some examples, each discrepancy may adjust the application score for an increased likelihood of fraud (e.g., increase the score to a greater score than an application without the discrepancy, etc.).

The discrepancy module 140 may also be configured to identify one or more risk indicators. For example, the discrepancy module 140 may review the application data and compare a subset of the application data with one or more risk profiles. When the similarities between the application data and the risk profile exceed a risk threshold, the discrepancy module 140 may be configured to identify an increased likelihood of fraud or risk with the application.

The discrepancy module 140 may also be configured to determine a risk profile. In some examples, the discrepancy module 140 may be configured to compare the risk profile with the application data to determine similarities or discrepancies between the risk profile and the application data. Weights may be adjusted in the context of other input features presented according to the risk profile (e.g., during training of the ML model, etc.). Potential risk profiles may include a straw borrower, income fraud, collateral fraud, employment fraud, synthetic identity, early payment default, misrepresentation without loss, dealer fraud, or geography fraud. Other types of risk profiles are available without diverting from the essence of the disclosure.

An example risk profile may comprise a straw borrower. For example, a borrower user may provide application data corresponding with their true identity and the vehicle corresponding with the application data may be driven and maintained by a different user. The borrower user may fraudulently assert that the vehicle is for their use. The borrower user, in some examples, may be offered different interest rates or different requirements for taking possession of the vehicle. For example, the user who is driving and maintaining the vehicle may not otherwise meet the credit requirements or other requirements necessary to be eligible to purchase the vehicle. The differences associated with offers provided by the lender user to the borrower user may incentivize the borrower user to provide fraudulent application data to receive better offers.

In some examples, one or more signals of a straw borrower may be provided in the application data. For example, the application data may comprise different addresses between borrower and co-borrower (e.g., by determining a physical location of each address and comparing the distance between the two addresses to a distance threshold). In another example, the application data may comprise different ages between borrower and co-borrower (e.g., by determining an age of each borrower entity from a date of birth and comparing the difference in ages to an age threshold). In yet another example, the application data may be compared with a user profile corresponding with a particular vehicle (e.g., by receiving a user profile of a borrower that typically owns the vehicle and comparing at least a portion of the profile with application data associated with the borrower user applying for the current vehicle, including ages of the standard user and the current user).

Another example risk profile may comprise income fraud. For example, a borrower user may provide application data corresponding with their true employment data, including employer and job title, yet salary provided with the application data may be inaccurate. The borrower user may fraudulently state their income for various reasons, including to qualify for a greater value of a loan from a lender user or to receive a better interest rate. The discrepancy module 140 may be configured to match the employment data with known salary ranges for a particular employer or job title in a particular geographic location. Any discrepancy between known salary ranges and the asserted salary with the application data may increase the application score that identifies the likelihood of fraud or risk with application.

Another example risk profile may comprise a collateral fraud. For example, a borrower user may provide accurate information for an application and a dealer user may provide fraudulent information for the same application, with or without the knowledge of the borrower user. As a sample illustration, the dealer user may understate mileage for a used vehicle or represent the condition of the vehicle to be better than it actually is, in order to help the borrower qualify for a loan from the lender user that would otherwise not be approved. In some examples, the dealer user may intentionally inflate the value of the vehicle by misrepresenting the features on the car to the lender user. In some examples, the lender user may rely on the fraudulent application data to calculate a "Loan To Value" ratio, so that the actual value of the vehicle may be less than the calculated value of the vehicle.

Another example risk profile may comprise employment fraud. For example, a borrower user may provide application data corresponding with employment that is inaccurate, including an incorrect employer, contact information, or job title. In some examples, the borrower user may be unemployed and may identify a nonexistent employer in the application data. The discrepancy module 140 may be configured to compare the name of the employer with historical application data to identify any new employers that have not been previously identified in previous applications. In some examples, the employer data from the application data may be compared with third-party data sources (e.g., distributed data store, website crawl, etc.) to accumulate additional employer data and store with the profile data store 150. The discrepancy in comparing the name of the employer with employer data may increase application score that identifies the likelihood of fraud or risk with the application.

Another example risk profile may comprise a synthetic identity. For example, a borrower user may provide application data corresponding with their true identity and may access a unique user identifier (e.g., Social Security number, universal identifier, etc.) that does not correspond with their true identity. The borrower user may provide the fraudulent user identifier of another person with their application data and assert the fraudulent user identifier as their own. The discrepancy module 140 may be configured to access user data corresponding with the unique user identifier from a third party source and compare the user data with application data provided by the borrower user. Any discrepancies between the two sources of data may be used to update the application score to identify an increased likelihood of fraud.

Another example risk profile may comprise an early payment default. For example, a borrower user may be likely to default within a predetermined amount of time (e.g., six months) of a loan funding from the lender user device. The discrepancy module 140 may be configured to compare historical application data with the current application data to identify one or more input features in the application data that match historical applications that have defaulted within the predetermined amount of time of the loan funding. Any similarities between the two sources of data may be used to update the application score to identify an increased likelihood of fraud.

Another example risk profile may comprise misrepresentation without loss. For example, a borrower user may not be likely to default within the predetermined amount of time of a loan funding from the lender user device, but the borrower user may have provided fraudulent data with the application originally. The discrepancy module 140 may be configured to identify the fraud and update the application score to identify a lower likelihood of risk to a lender user device. For example, the application score may correspond with a higher likelihood of fraud and, in some examples, the output may identify a lower likelihood of loss of repayment for the lender user device.

Another example risk profile may comprise dealer fraud. For example, a dealer user may accept a plurality of applications from a plurality of borrower users. The dealer user may add fraudulent information to the applications rather than the borrower user (e.g., to increase the likelihood of approval of a loan from a lender user). In some examples, this type of fraud may affect a second level score (e.g., a dealer user application score) more than a first level score (e.g., a borrower user application score). The discrepancy module 140 may be configured to identify a higher rate of fraud across the plurality of applications that originate from the dealer user and update the application score to identify a higher likelihood of fraud for applications originating from the dealer user.

Another example risk profile may comprise geography fraud. For example, historical fraud data may identify an increased likelihood of fraud and in particular geographic location (e.g., a ZIP Code, a city, a state, or other geographic indicator). The discrepancy module 140 may be configured to identify a borrower user device as also corresponding with a geographic location (e.g., a home location, a work location, etc.). The discrepancy module 140 may be configured to match the geographic locations corresponding with the borrower user device and the location of the increased likelihood of fraud, and adjust a score to identify the increased likelihood of geography fraud for a borrower user associated with that geography (e.g., increase application score from 500 to 550).

The fraud detection computer system 120 may comprise a fraud scoring engine 142. The fraud scoring engine 142 may be configured to determine one or more machine learning (ML) models to apply to application data. In some examples, the discrepancies or similarities between the risk profile and the application data may be provided as input to the ML model as well. Different models may also be used to detect different entities committing the fraud (e.g., borrower fraud v. dealer fraud), or to predict a fraud type (e.g., income fraud, collateral fraud, identity fraud, straw borrower fraud, employment fraud, etc.). These different models may be constructed using an input feature library where one or more input features may be based on a variety of micro fraud patterns observed in the application data. The fraud scoring engine 142 may be configured to compute a first level score corresponding with a borrower user, or a second level score corresponding with a dealer user. The first and second level scores may be computed concurrently or separately, as further described herein.

The fraud scoring engine 142 may also be configured (e.g., with the application engine 136) to determine a score by applying application data as input features to one or more ML models. In some examples, the score may identify a collective risk associated with the dealer user device 112. In some examples, the ML model may be associated with a segment, so that when the application data is determined to correspond with that segment (e.g., comparing, matching, etc.), the application data may be provided to the applicable ML model.

A plurality of ML models may be trained. For example, the ML model may be trained using historical application data by receiving a plurality of application data and determinations of whether fraud was discovered according to the risk profiles described herein. In some examples, the ML model may be trained using a weight applied to one or more input features (e.g., greater weight with a higher correlation of fraud in historical application data, etc.). Signals of fraud that may be common across the historical application data may be used to identify fraud in subsequent application data prior to the fraud occurring.

A plurality of ML models may be trained to correspond with a plurality of segments, such that at least one ML model may be trained to determine an output associated with a single segment. Various devices or computer systems may assign segmentation information to the application data, including the lender user device 116 or the fraud detection computer system 120. In either instance, these computing systems may be configured to determine the segmentation information corresponding with the application data.

As a sample illustration, a segment may correspond with prime loan or subprime loan, each of which may correspond with application data. If an application is associated with a prime loan, the application may be submitted to a ML model corresponding with a prime model. Similarly, if an application is associated with a subprime loan, the application may be submitted to a ML model corresponding with a subprime model.

The fraud detection computer system 120 may comprise a code module 144. The code module 144 may be configured to determine one or more reason codes for the application. For example, one or more features may influence the application score above a particular threshold to identify a potential risk or fraud. The features may correspond with a reason code that indicates an amount the feature can affect the application score and/or a reason that the feature affects the application score the way that it does. In some examples, the potential reason may be user defined (e.g., an administrator of the service may define reasons for particular features when seen in isolation or in combination with other features). In some examples, the one or more features may be grouped into categories (sometimes referred to as factor groups). Examples of factor groups include income, employment, identity, or the like. In each factor group, one or more features may be identified in order to be used to determine reason codes.

The code module 144 may also be configured to generate a reason code based on the input features that appear to be most prominent on the application score. For example, an application score risk may be a first type of feature, a fraud rate risk may be a second type of feature, and a volume of risk may be a third type of feature. In some examples, the input features may correspond with a plurality of applications and/or aggregated application data associated with a dealer user device. In some examples, an input feature may correspond with a risk signal that may determine a likelihood of fraud associated with a portion of the application data for the dealer user device. The input feature, in some examples, may be predetermined prior to providing the application data to a trained ML model.

The code module 144 may also be configured to provide a generated reason code to a user device. For example, the fraud detection computer system 120 may determine the reason code according to the determined application score and/or information received by a scoring service.

The fraud detection computer system 120 may comprise an action engine 146. The action engine 146 may be configured to determine one or more actions to perform in association with the application score, input features, segment, and other data described herein. The one or more actions may be determined based upon the one or more reason codes or any application data that may influence the application score above the particular threshold (e.g., when a discrepancy is determined between the application data and a third party data source, when a similarity is determined between a risk profile and the application data, etc.). The fraud detection computer system 120, via the ML model, may output the application score along with the one or more reason codes with an indication associated with each of the one or more actions.

The action engine 146 may also be configured to determine a risk based on threshold. For example, when an application is determined to be high risk based upon a first level score or a second level score calculated for the application, an action may include additional review of the application, submitting the application to a second ML model, providing the application data to an administrator for manual review, or other actions described herein.

As a sample illustration, a high application score may correspond with a score of 700 or greater. Accordingly, any application with a score above the threshold of 700, for example, may be determined to be high risk, such that an application corresponding with this score may be, for example, 70% more likely to contain fraudulent information than an application corresponding with a lower score. In another example, one out of twenty applications might be fraudulent, in comparison with one out of one hundred applications that may be fraudulent with a lower score. For another example, when the application is determined to be medium risk, an action of additional review of one or more portions of the application with underwriter review may be suggested. A medium threshold associated with medium risk may correspond with the score range of 300-700. Accordingly, any application with a score within the medium threshold may be determined to be medium risk. For another example, when the application is determined to be low risk, an action of streamlining the application (without additional review) may be suggested. A low threshold associated with low risk may correspond with score range of 1-399. Accordingly, any application with a score between 1-399 may be determined to be low risk.

The action engine 146 may also be configured to suggest actions between the lender user device, dealer user device, and/or the borrower user device. For example, when a dealer user application fraud scores are high in comparison with the threshold, an action for a lender user to contact the borrower user may be suggested. For another example, when a stated income for a borrower is substantially higher than expected, a borrower user may be asked to provide proof of income. For another example, when a stated employer is associated with a higher risk of fraud based upon prior fraud reports, a dealer user may be asked to contact the identified employer. For another example, when a borrower, application, and/or bureau profile pattern closely matches prior patterns of synthetic identity fraud, an action to perform an identification check may be suggested.

The action engine 146 and/or code module 144 may also be configured to interact with the code/action data store 154. The code/action data store 154 may include a plurality of reason codes for the application based on the identified application score for the application, as well as a plurality of suggested actions based on the identified application score. In some examples, the action engine 146 and/or code module 144 may provide the application score and any input features associated with the application as search terms to the code/action data store 154. The code/action data store 154 may return one or more reason codes or actions to include with the output.

One or more modules and engines of the fraud detection computer system 120 may also be configured to analyze and determine second level scores (e.g., application scores associated with a dealer user and/or second ML model). Any of the functions described herein may be implemented in determining the second level score. For example, the application engine 136 may be configured to receive application data. The profiling module 138 may be configured to determine a segment associated with the application data and generate one or more input features for providing to a first ML model. The fraud scoring engine 142 may be configured to determine a score for a plurality of applications, corresponding with first level scores. The fraud detection computer system 120 may combine (e.g., aggregate, etc.) these application scores based on common information, including a common dealer user. The combined application scores for a common dealer user may correspond with a second level score. The first level score and/or the second level score, and corresponding user information for each of the one or more scores, may be stored with the scores data store 152.

The fraud detection computer system 120 may be configured to provide various output to a user interface, including a first level score and/or codes 160 or second level score and/or codes 162. For example, the first level score and/or codes 160 may be based at least in part on information included in the application. Such information may be received from the borrower user device (e.g., in response to the borrower user submitting the application or the borrower user sending the information separately), the dealer user device (e.g., in response to the dealer submitting the application or the dealer sending the information separately), or the lender user device (e.g., in response to the lender submitting the application or the lender sending the information separately). The application score may be sent to the lender user for the lender user to determine a level of diligence required to assess the application.

In some examples, first level score and/or codes 160 may be compared with one or more score ranges. A first range for application scores may correspond with providing the application score as output to a user device and a second range for application scores may correspond with not providing the application score as output to a user device.

As a sample illustration, a score of three hundred may correspond with a second range for scores that identify applications with a lower likelihood of fraud or risk. When the score is determined in this second range, the fraud detection computer system 120 may identify that fraud is less likely with this application. As another illustration, a score of nine hundred may correspond with a first range of scores that identify applications with a higher likelihood of risk or fraud. When the score is determined in this first range, the fraud detection computer system 120 may provide the score one or more reason codes for the application corresponding with this higher risk, and one or more actions for the application to help mitigate the risk and reduce the instance of fraud. A sample output of a score corresponding with this first range is provided with FIG. 7.

A second level score and/or codes 162 may also be computed. The second level score and/or codes 162 may be based at least in part on scores computed for a dealer user. The second level score, with or without the first level scores, may be transmitted to the lender user, for example, for the lender user to determine the level of diligence required when reviewing the application and/or determination of providing funding to the borrower user.

The output may be adjusted based at least in part on the origin of the request. For example, a borrower user may submit an application for an item offered by a dealer user device. The application may request, for example, loan assistance from a first lender user device and/or a second lender user device. The fraud detection computer system 120 may determine a score for the application based at least in part on the historical interactions between the first lender user device and the dealer user device as well as interactions between the second lender user device and the dealer user device. When a greater number of fraudulent applications appear historically between the first lender and the dealer, the score associated with the application from the borrower user may be adjusted with a greater likelihood of fraud based at least in part on the interactions between the dealer and the first lender. In some examples, the score determined and provided to the second lender user device may be adjusted with a lesser likelihood of fraud based at least in part on the historical interactions between the dealer and the second lender. As such, one of the input features that are provided to the ML model associated with the application may include an identification of the dealer user device and/or the lender user device.

In another example, the output may be adjusted based at least in part on the entities associated with application. For example, application data associated with a borrower user device may identify a higher likelihood of fraud using any of the methods described herein. The application score may be adjusted higher corresponding with this identified likelihood of fraud associated with the borrower user device. In another example, a dealer user device may be associated with a higher likelihood of fraud across a plurality of applications (e.g., as identified from historical or consortium data, from currently pending application data, etc.). The application score may be adjusted higher for any application corresponding with this identified likelihood of fraud associated with the dealer user device.

Figure 2:
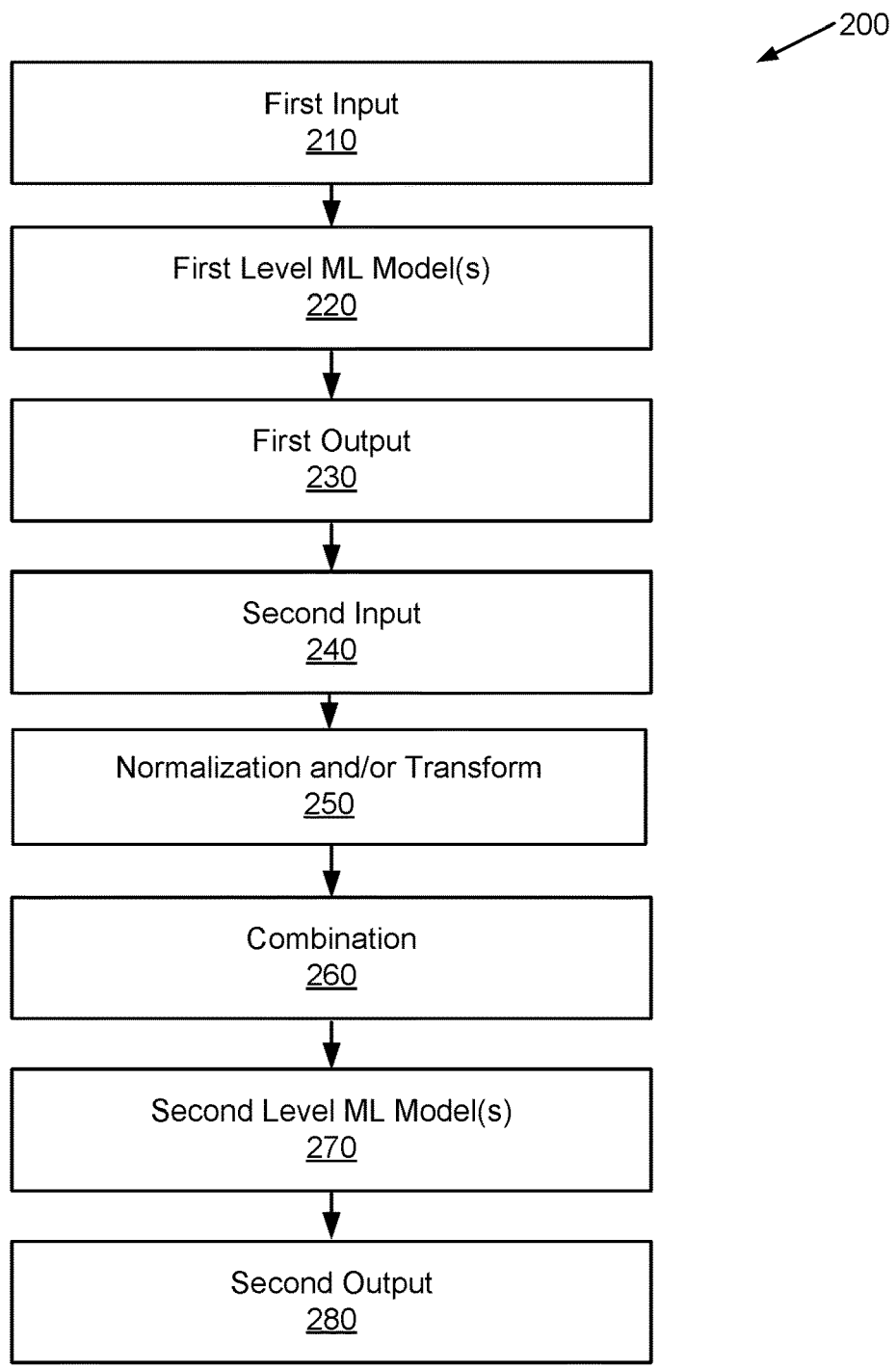
FIG. 2 illustrates a fraud detection and risk analysis process implemented by a distributed system according to an embodiment of the disclosure.

FIG. 2 illustrates a fraud detection and risk analysis process implemented by a distributed system according to an embodiment of the disclosure. In illustration 200, a fraud detection computer system 120 of FIG. 1 may perform the described process by implementing one or more modules (e.g., including the interface engine 132, the user module 134, the application engine 136, the profiling module 138, the discrepancy module 140, the fraud scoring engine 142, the code module 144, and/or the action engine 146) to perform these and other actions.

Illustration 200 may be performed under the control of one or more computer systems configured with executable instructions and may be implemented as one or more computer programs or applications executing collectively on one or more processors, by hardware or software. The could they be stored on a computer readable storage medium, for example, in the form of computer program comprising a plurality of instructions executable by one or more processors the computer readable storage media may be non-transitory.

An application may be completed on behalf of a first borrower user for an item offered by a second dealer user. The second dealer user device may submit the application data to a third lender user device to request funding in exchange for the item offered by the second dealer user. The application data may also include a segment that may be determined by the third lender user device 116 or later by the fraud detection computer system 120 (e.g., prime or not prime credit score, franchised dealer or independent dealer, etc.). The third lender user device may generate an application object for the application that includes information associated with the first borrower user device and provided with the application. The third lender user device may transmit the application object to a fraud detection computer system 120.

At 210, a first input may be received. For example, the fraud detection computer system 120 may receive an application object for an application that includes information associated with a first borrower user device 110 as well as a segment corresponding with the application object. The fraud detection computer system 120 may receive a request from the third lender user device 116 associated with application data.

The information associated with the first borrower user device 10 may be provided via a web-based form or other network communication protocol. For example, a dealer user device 112 may select a user selectable option from a webpage and the selection of the option may indicate a submission of the application associated with the first borrower user device 110 by the dealer user device 112.

Upon determining that the segment is a particular type of segment, the fraud detection computer system 120 may generate one or more input features associated with the application. In some examples, the input features may be based on application data and may comprise independent variables that are provided as input to an ML model.

At 220, one or more input features may be applied to a first trained ML model. For example, the fraud detection computer system 120 may determine a first score for the application by selecting the score from a plurality of scores and determining the score by applying at the input features to the trained ML model.

The fraud detection computer system 120 may apply various ML models and embodiments of the disclosure. The models may correspond with linear or non-linear functions. For example, a ML model may comprise a supervised learning algorithm including a decision tree that accepts the one or more input features associated with the application to provide the score.

The ML model may comprise a Naive Bayes classifier that associates independent assumptions between the input features.

The ML model may comprise logistic regression that measures the relationship between the categorical dependent variable (e.g., the likelihood of fraud) and one or more independent variables (e.g., the application data) by estimating probabilities using a logistic function.

The ML model may comprise a neural network classifier that measures the relationship between the categorical dependent variable (e.g., the likelihood of fraud) and independent variables (e.g., the application data) by estimating probabilities using multiple layers of processing elements that ascertain non-linear relationships and interactions between the independent variables and the dependent variable.

The ML model may further comprise a Deep Learning Neural Network, consisting of more than one layer of processing elements between the input layer and the output later. The ML model may further be a Convolutional Neural Network, in which successive layers of processing elements contain particular hierarchical patterns of connections with the previous layer.

The ML model may further comprise an unsupervised learning method, such as k-nearest neighbors, to classify inputs based on observed similarities among the multivariate distribution densities of independent variables in a manner that may correlate with fraudulent activity.

The ML model may further comprise an outlier detection method, which identifies significant deviations from the multivariate density distributions of a plurality of independent variables, even if such deviations have not previously been correlated with fraud in historical application data.

The ML model may further comprise an ensemble modeling method, which combines scores from a plurality of the above ML methods or other methods to comprise an integrated score.

Prior to receiving the input features associated with the application data, the ML model may be trained using a training data set of historical application data. For example, the training data set may comprise a plurality of application data and determinations of whether fraud was discovered according to the risk profiles described herein. The ML model may be trained using historical data to determine one or more weights assigned to each of the input features according to a risk profile. In some examples, input features from the historical data that are common amongst a subset of applications may be identified as indicators of potential fraud according to the risk profile. The ML model may determine subsequent application data that identifies similar features as the training data set in order to determine a score for the application that identifies the similarities between the training data set and the application data.

At 230, a first output may be determined. For example, the fraud detection computer system 120 may determine the first output as the score from the trained ML model. In some examples, the score may be correlated with a user identifier associated with the borrower user device and stored with the scores data store 152. The score may be retrieved in response to a search query of the data store. In some examples, the score may be provided in an application report or electronic message to a user device.

In some examples, the output may also comprise one or more reason codes and/or one or more suggested actions corresponding with the score or the reason codes. For example, the fraud detection computer system 120 may determine the input features that closely corresponded to the risk profiles implemented by the trained ML model. Each of the input features may correspond with one or more reason codes and/or one or more suggested actions. In some examples, the fraud detection computer system 120 may select a first input feature and provide it as a search term to the code/action data store 154. The data store may return the one or more reason codes that correspond with the first input feature as well as one or more actions that correspond with the first input feature. The returned data from the code/action data store 154 may be added, with the score, to the application report or electronic message transmitted to the user device.

At 240, a second input may be received. For example, the fraud detection computer system 120 may receive one or more scores stored with the scores data store 152 and/or historical application data stored with the profiles data store 150. At least some of this information may correspond with output from the first ML model. The application data and/or scores may be received as input for a second ML model. In some examples, the fraud detection computer system 120 may also receive additional data, including third-party and/or consortium data corresponding with one or more dealer user devices. In some examples, the output, historical application data, third-party data, and/or consortium data may correspond with a particular dealer user. In some examples, the application score associated with the dealer user may identify the likelihood of fraud corresponding with applications submitted by the dealer user device to the lender user device.

At 250, the data may be normalized and/or transformed. For example, the fraud detection computer system 120 may receive the dealer user name, address, or other information associated with the dealer user. The fraud detection computer system 120 may normalize this data by removing periods, spaces, or capitalization of characters to form a string of text associated with the dealer user. The fraud detection computer system 120 may transform this data by removing generic words including "a" or "the." In some examples, the normalization and/or transformation process may add information as well, including adding the word "and" in place of an "&" (ampersand). The normalization and/or transformation of the dealer user information may help standardize different sources of dealer user information. This may include different applications provided by different borrower users.

In some examples, the normalized and transformed data may be matched or clustered. For example, the fraud detection computer system 120 may identify a first dealer user name from a first data source and a second dealer user name from a second data source. The fraud detection computer system 120 may cluster these two sources of data when a number of fields of the two data sources match by a field threshold. The fields may comprise, for example, the dealer name, street address, ZIP Code, state, and phone number. In an illustrative example, the field threshold may correspond with four, such that when four of the fields for the first dealer user from the first data source match four of the fields for the second dealer user from the second data source, the first dealer user name and the second dealer user name may be clustered into a single cluster.

In another example, the field threshold may correspond with particular fields in the data sources, such that when these fields match across different data sources, the user names from these sources may be combined into a cluster. As an illustrative example, the field threshold may correspond with a dealer user name and ZIP Code, such that when the first data source and the second data source provide a dealer user name and ZIP Code that match, these two sources of data may be clustered as a single dealer user.

The data sources may be compared using a tiered matching algorithm, including fuzzy matching. For example, the fraud detection computer system 120 may receive the normalized and transformed data and apply fuzzing matching algorithm to the data. When similarities are detected above a similarity threshold (e.g., 90 out of 100 potential match score), the fraud detection computer system 120 may cluster this data to identify individual dealer users. The individual dealer user may be assigned a new dealer user identifier to correspond with the combined data records.

At 260, the data may be combined for the particular user. For example, the fraud detection computer system 120 may correlate a dealer user identifier for any data entry corresponding with the particular dealer user. The combination of the dealer user data may identify any application data corresponding with a particular dealer user, including current or historical data. Duplicate data may be removed in the combination process. This may help identify any application data submitted in association with the particular dealer user to any lender user for approval of an application on behalf of any borrower user.

At 270, one or more input features may be applied to a second trained ML model. For example, the fraud detection computer system 120 may determine a second score by selecting the application score from a plurality of application scores and determining the second score by applying at the input features to the trained second ML model.

The fraud detection computer system 120 may apply various ML models and embodiments of the disclosure. For example, the trained second ML model may comprise a supervised learning algorithm including a decision tree that accepts the one or more input features associated with the application to provide the second level score.

The second ML model may comprise a Naive Bayes classifier that associates independent assumptions between the input features.

The second ML model may comprise logistic regression that measures the relationship between the categorical dependent variable (e.g., the likelihood of fraud) and one or more independent variables (e.g., the application data) by estimating probabilities using a logistic function.

The second ML model may comprise a neural network classifier that measures the relationship between the categorical dependent variable (e.g., the likelihood of fraud) and independent variables (e.g., the application data) by estimating probabilities using multiple layers of processing elements that ascertain non-linear relationships and interactions between the independent variables and the dependent variable.

The second ML model may further comprise a Deep Learning Neural Network, consisting of more than one layer of processing elements between the input layer and the output later. The ML model may further be a Convolutional Neural Network, in which successive layers of processing elements contain particular hierarchical patterns of connections with the previous layer.

The second ML model may further comprise an unsupervised learning method, such as k-nearest neighbors, to classify inputs based on observed similarities among the multivariate distribution densities of independent variables in a manner that may correlate with fraudulent activity.

The second ML model may further comprise an outlier detection method, which identifies significant deviations from the multivariate density distributions of a plurality of independent variables, even if such deviations have not previously been correlated with fraud in historical application data.

The second ML model may further comprise an ensemble modeling method, which combines scores from a plurality of the above ML methods or other methods to comprise an integrated score.

At 280, a second output may be determined. For example, the fraud detection computer system 120 may determine the second output as the score from the trained second ML model. In some examples, the second level score may be correlated with a user identifier associated with the dealer user device and stored with the scores data store 152. The application score may be retrieved in response to a search query of the data store. In some examples, the second level score may be provided in an application report or electronic message to a user device.

In some examples, the second output may also correspond with one or more reason codes and/or one or more suggested actions corresponding with the second level score. For example, the fraud detection computer system 120 may determine the input features that closely corresponded to the risk profiles implemented by the trained second ML model. Each of the input features may correspond with one or more reason codes and/or one or more suggested actions. In some examples, the fraud detection computer system 120 may select a second input feature and provide it as a search term to the code/action data store 154. The data store may return the one or more reason codes that correspond with the second input feature as well as one or more actions that correspond with the second input feature. The returned data from the code/action data store 154 may be added, with the application score, to the application report or electronic message transmitted to the user device.

In some examples, the output may be adjusted according to a requesting device. For example, a lender user device may request to receive a second level score corresponding with the second output. The fraud detection computer system 120 may determine a correlative score for each of the plurality of applications to identify one or more links between the dealer user associated with the application and a lender user associated with the application. The correlative score may be provided as an input feature or other input to the second ML model in determining the second output. In some examples, the correlative score may be a binary identifier or flag that identifies other similar applications that share a same dealer/lender relationship. These applications may be clustered and/or used to adjust the second output.

In some examples, the applications that share a same dealer/lender relationship (e.g., Lender A with Dealer A) may be distinguished from other applications that do not share the same dealer/lender relationship (e.g., Lender A with Dealer B, or Lender B with Dealer A, etc.). In some examples, the applications that do not share the same dealer/lender relationship may be maintained and flagged (e.g., based on the correlative score) and provided to the ML model. In some examples, the applications that do not share the same dealer/lender relationship may be filtered or removed and not provided to the ML model.

In some examples, additional applications may be provided with the input features. For example, a plurality of dealer users may correspond with one or more attributes. Applications associated with the cluster of dealer users that share the common attribute may be provided to the ML model, at least in part to increase an amount of data provided to the ML model from similar dealer users. A similar process may correspond with similar lender users or similar borrower users by providing applications associated with the cluster of lender/borrower users that share the common attribute to the ML model. In some examples, applications associated with the dealer users and lender users that correspond with a correlative score above a threshold value may be provided to the ML model.

Figure 3:
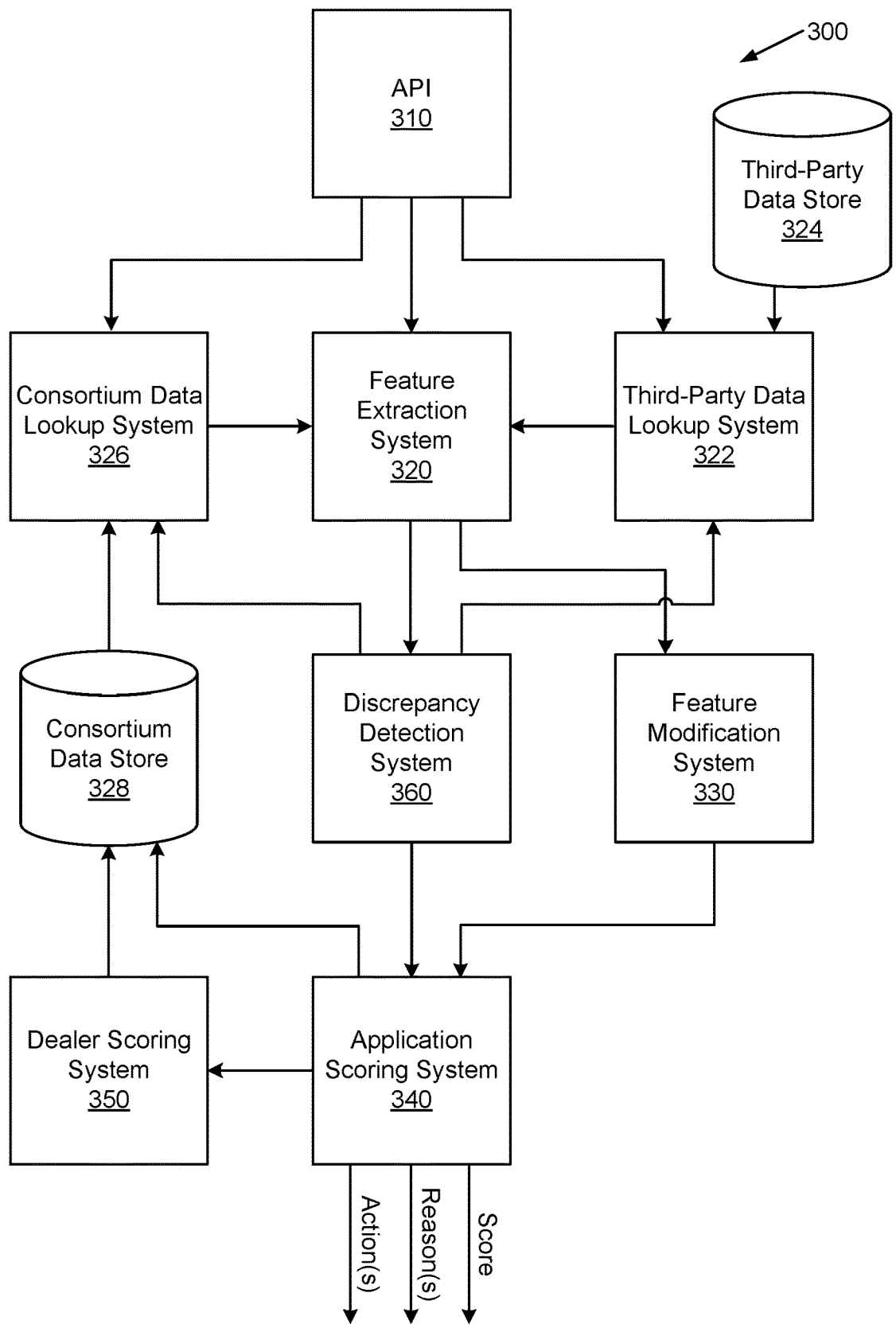
FIG. 3 illustrates a distributed system for fraud detection according to an embodiment of the disclosure.

FIG. 3 illustrates a distributed system for fraud detection according to an embodiment of the disclosure. In illustration 300, an example of a fraud detection computer system is provided. The fraud detection computer system may identify fraud in a plurality of applications. The fraud detection computer may differentiate between different types of fraud. For example, fraud may comprise application fraud that results in a first payment default, an early payment default and loss amount greater than a certain percentage (e.g., 75%, 80%, 85%, 90%, or other suitable percentage) of the loan amount, an unrecovered charge-off and loss amount greater than a certain percentage (e.g., 75%, 80%, 85%, 90%, or other suitable percentage) of the loan amount, or any combination thereof. In some examples, the fraud detection computer system may also identify loan applications explicitly indicated by the lender user device as having confirmed fraud.

The fraud detection computer system may include application programming interface (API) 310. API 310 may be used by devices to communicate with the distributed system. For example, API 310 may correspond to a website that allows devices to submit a loan application. For another example, API 310 may correspond a receiver that is configured to receive a batch of one or more loan applications. For another example, API 310 may allow a remote service (e.g., a web service) that is executing on the devices to communicate with the fraud detection system. The web service may have a direct connection with the fraud detection system such that the devices may submit a loan application without having to navigate to a web page or send loan applications using the receiver.

The fraud detection system may further include feature extraction system 320. Feature extraction system 320 may determine one or more features for a loan application. For example, a feature may be computed by performing a mathematical operation on a piece of information associated with the loan application. An example of such a feature would be changing a price associated with the loan application to ln(price) or transforming an attribute into a number of standard deviations from a mean of all observations.

For another example, a feature may be computed by forming a ratio of a first piece of information and a second piece of information associated with the loan application. An example of a ratio would be a loan to value ratio, where the first piece of information is the loan amount and the second piece of information is the value of the loan collateral.

For another example, a feature may be computed using a function to compute a value from one or more pieces of the information. An example of a value computed using a function would be determining the latitude and longitude of a Zone Improvement acronym (ZIP) Code™.

When multiple types of information are available, a feature may be computed from multiple pieces of a single type of information or from one or more pieces of multiple types of information. An example of a feature computed from multiple pieces of a single type of information is using the borrower ZIP code and the dealer ZIP code to calculate the distance between the borrower and the dealer. An example of a feature computed from one or more pieces of multiple types of information includes a ratio of the borrower income to the borrower credit score.

Examples of information used to determine a feature include borrower information, dealer information, lender information, third party information, application information, historical information, or the like, or any combination thereof.

The borrower information may include an identification of the borrower, an address where the borrower resides, an employer of the borrower, an age of the borrower, an income of the borrower, and/or other information regarding the borrower.

The dealer information may include an identification of a dealer, a length of time the dealer has been in business, a number of applications the dealer has received in an amount of time, a number of customers the dealer has received in an amount of time, a dealer score that is determined based upon one or more previous application scores for the dealer, a number of locations associated with the dealer, an average credit score that the dealer has submitted, an average income that the dealer has submitted, a number of applications in a particular month, a change in a number of applications over multiple months, or other information regarding the dealer. In one illustrative example, the dealer score may be an average of the one or more previous application scores for the dealer. However, it should be recognized that other information may be used in order to compute the dealer score.

The lender information may include an identification of a lender, a number of loans a particular dealer has made with the lender, a number of applications that have been associated with fraud, whether the lender is a prime lender or a non-prime lender, an identification of one or more dealers that the lender is associated with, or other information regarding the lender.

The third party information may include a fraud likelihood for a particular ZIP code, a number of miles from a first location to a second location, census information, vehicle information, average income by ZIP code, or other information located in a location remote from the fraud management system.

The application information may include an identification of the loan collateral, a length of repayment for a loan application, an amount associated with the loan application, or other information included in the loan application.

The historical information may be supplied by one or more lenders. The historical information may be used to allow a lender to share information associated with loan applications that the lender receives and dealer information associated with a dealer that interacts with the lender.

Information such as the borrower information, dealer information, lender information, and application information may be received using API 310. Information such as third party information may be received using third-party data lookup system 322. Third-party data lookup system 322 may be configured to obtain information from one or more data stores (e.g., third-party data store 324) based upon information received through API 310. For example, when particular information is received through API 310, third-party data lookup system 322 may obtain particular information. In some examples, third-party data lookup system 322 may obtain information by sending a query to a data store.

Information such as historical information may be received using consortium data lookup system 326. Consortium data lookup system 326 may be configured to obtain information from one or more data stores (e.g., consortium data store 328) based upon information received through API 310. Consortium data store 328 may store one or more outputs from application scoring system 340 and/or one or more outputs from dealer scoring system 350. For example, consortium data store 328 may include one or more application scores, one or more reason codes, one or more actions, or the like. By storing outputs from application scoring system 340 and dealer scoring system 350, consortium data store 328 may have historical information regarding loan applications.

In some examples, the one or more features may be selected based upon a factor group extraction subsystem. The factor group extraction subsystem may identify one or more features that are likely to point to one or more material misrepresentations in the loan application.

Feature extraction system 320 may output one or more features to feature modification system 330. Feature modification system 330 may modify one or more features in order to obtain better results from application scoring system 340. For example, feature modification system 330 may normalize, transform, and/or scale a feature. An output from feature modification system 330 may be provided to application scoring system 340.

Feature extraction system 320 may also output one or more features to discrepancy detection system 360. Discrepancy detection system 360 may include scorecard models and/or expert rules designed to flag inconsistent and/or out-of-pattern data values within the outputs of feature extraction system 320. One example of this type of data value discrepancy may be a loan amount substantially greater than the list price of the collateral. For another example, if the borrower's stated income exceeds the known average income for the borrower's residential area by a certain percentage. Discrepancy detection system 360 may output a result to application scoring system 340, consortium data lookup system 326, and/or third-party data lookup system 322.

Application scoring system 340 may have one or more outputs. Outputs may include a score (e.g., an application score), a reason code (e.g., information corresponding to a feature identified for its effect on a score), and/or an action (e.g., an instruction to the lender for the lender to perform that corresponds to a feature). The application score may be used by a lender for the lender to determine a level of diligence required to assess if there are one or more material representations in the application.

In some examples, the scoring service may use an ML model for pattern recognition to compute the application score. The pattern recognition model may receive one or more features as input. The pattern recognition model may be trained based upon historical applications. For example, the historical applications may be those that the pattern recognition model has received in the past.

In some embodiments, application scoring system 340 may further include a factor group extraction subsystem. The factor group extraction subsystem may order the one or more features used as input to application scoring system 340. For instance, the ordering may be based upon an amount that each feature affected a score. The factor group extraction subsystem may also group the one or more features into one or more groups. Each group may be referred to as a factor group. Each feature in a factor group may be related to a particular characteristic (e.g., a type of fraud such as income fraud, collateral fraud, identity fraud, straw borrower fraud, or employment fraud). One or more features in each factor group may then be output. The output features indicating those that most affected the application may be used to determine reason codes. For examples, each feature may correspond to user-defined information that is referred to as a reason code. In some examples, the grouping may not be performed such that one or more top features (irrespective of what factor groups that the one or more top features are included in) are output.

In some examples, a feature (or factor group) identified by the factor group extraction subsystem may be mapped to a predicted type of fraud (e.g., income fraud, subprime income fraud, collateral fraud, identity fraud, straw borrower fraud, employment fraud, etc.). In such examples, the type of fraud may be output with the feature. In some examples, based upon the type of fraud and/or the one or more pieces of information, one or more actions may be suggested to the lender. In some cases, the one or more actions may correspond to a level of diligence required to assess if there are one or more material representations in the loan application.

Application scoring system 340 may output a score to dealer scoring system 350. Based upon information received through API 310 and/or one or more previous application scores for a dealer, dealer scoring system 350 may calculate a score for the dealer using a scorecard model. The scorecard model may include factors such as the historical application scores for applications from that dealer, historical averages of loan characteristics for applications from that dealer, historical averages of borrower characteristics from that dealer, indications of confirmed and suspicious fraud from historical applications from that dealer, and other similar characteristics. These historical factors may be weighted such that more recent factors have greater weight than less recent factors. The dealer score may be stored in consortium data store 328. The dealer score may then be updated after each new application is scored so that the new dealer score is immediately available for subsequent applications.

Figure 4:
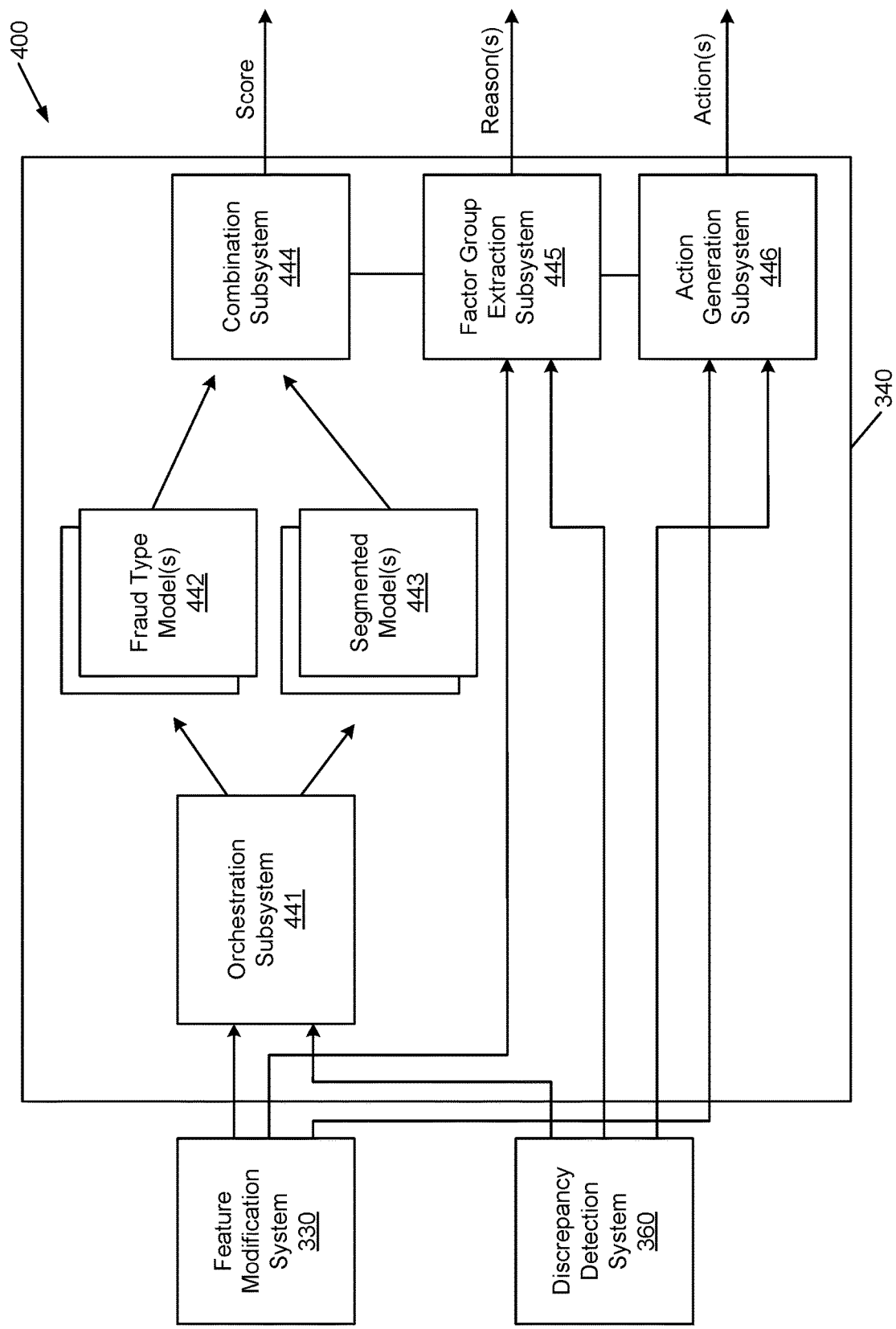
FIG. 4 illustrates an application scoring computer system according to an embodiment of the disclosure.

FIG. 4 illustrates an application scoring computer system according to an embodiment of the disclosure. In illustration 400, additional detail of the application scoring system 340 is provided. In some examples, the application scoring system 340 may receive one or more features from feature modification system 330 and/or discrepancy detection system 360.

In some examples, the one or more features may be received by orchestration subsystem 441 of the application scoring system. Orchestration subsystem 441 may invoke one or more different types of models to score an application based upon the one or more received features.

For illustrative purposes, different types of models may be for different fraud types (e.g., income fraud, employment fraud, vehicle value fraud, or the like) and/or different segments (e.g., subprime, prime, leasing, purchasing, ZIP code, or the like). A segment, as used herein, is a way to divide a population based upon a characteristic. For example, a population may be divided between subprime (sometimes defined as users that have difficulty maintaining a repayment schedule) and prime (i.e., sometimes defined as users that have shown less difficulty in maintaining a repayment schedule than users indicated as subprime). For another example, a population may be divided between leasing and purchasing. For another example, a population may be divided by ZIP code.

The application scoring system may further include combination subsystem 444 for combining outputs from the different models used for the one or more features to generate a single score (referred to as an application score). For example, combination subsystem 444 may combine an output from a first model with an output from a second model. The output of combination subsystem 444 may then be output from the application scoring system (to a device associated with a lender) and/or to factor group extraction subsystem 445.

Factor group extraction subsystem 445 may order features received from feature modification system 330 and/or discrepancy detection system 360. The ordering may be an order of how much the features affected the application score. In some examples, the ordering may be determined using a sensitivity analysis. For example, the factor group extraction subsystem 445 may remove one or more features to determine how much removal of the one or more features affect the application score. The features that change the application score more than other features may be ordered higher.

In some example, the features may be separated into one or more groups, referred to as factor groups, such that one or more features of each factor group may be output. When separated into one or more groups, each group may be ordered using the sensitivity analysis described above.

Factor group extraction subsystem 445 may output the one or more features identified by factor group extraction subsystem 445 to a location remote from the application scoring system (to a device associated with a lender) and/or to action generation subsystem 446. In some examples, each of the one or more features may be determined to correspond to a reason code. The reason code may also (or in the alternative) be output to the location or to action generation subsystem 446. A reason code may be a reason that a feature is identified by factor group extraction subsystem 445. For example, a reason code may be an amount of change that the factor caused or a string of text that indicates a mostly like reason that the feature is affecting the application score (as defined by an administrator of factor group extraction subsystem 445).

Action generation subsystem 446 may identify one or more actions based upon one or more features output from factor group extraction subsystem 445, one or more reason codes output from factor group extraction subsystem 445, one or more features output from feature modification system 330, one or more features output from discrepancy detection system 360, or any combination thereof. Action generation subsystem 446 may output the one or more actions from the application scoring system to a device associated with a lender. The one or more actions may indicate what a lender may perform. The actions may include further steps that may be used to determine whether there are one or more material representations in an application, which may prevent fraud or verify that the borrower is not misrepresenting certain information. In one illustrative example, an action may include a requirement that a potential borrower provide verification of income (such as by providing a pay stub, tax returns, and/or other information).

Description below reiterates and/or goes into more detail regarding features described above. In some descriptions below, the features described above have been modified to a different format. It should be recognized that the description herein may be subject to other modifications, additions, or deletions.

Figure 5:
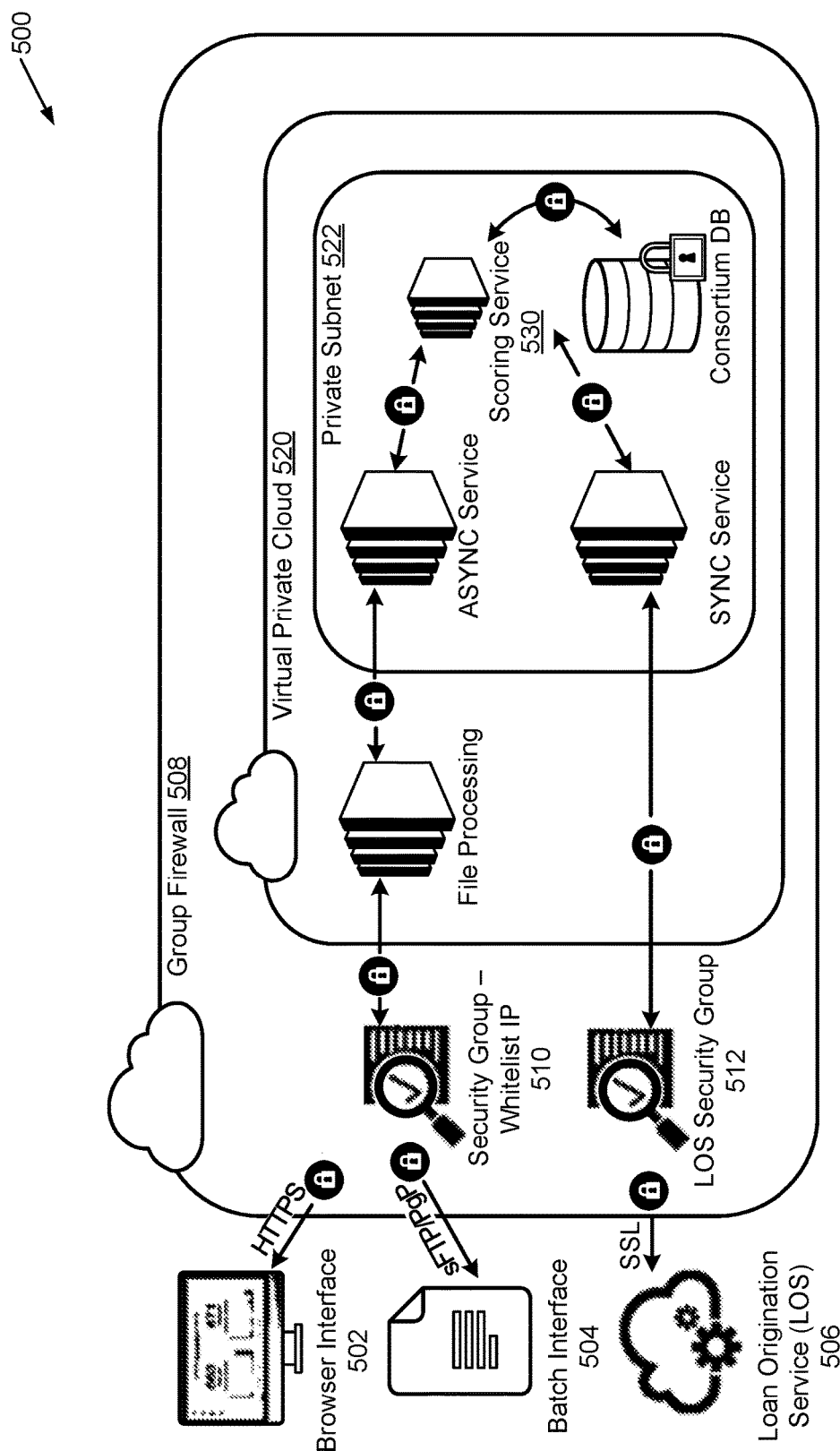
FIG. 5 illustrates a distributed system for fraud detection according to an embodiment of the disclosure.

FIG. 5 illustrates a distributed system for fraud detection according to an embodiment of the disclosure. In illustration 500, the fraud detection computer system may receive information regarding a loan application using one or more interfaces. For example, the fraud detection computer system may include a browser interface 502, a batch interface 504, and/or a loan origination service (LOS) 506. The browser interface 502 and the loan origination service 506 may be used to submit a loan application to the fraud detection computer system. The batch interface 504 may be used to submit multiple loan applications to the fraud detection computer system.

In some examples, browser interface 502 may correspond with a website provided for interfacing with a fraud detection computer system. The browser interface 502 may allow for a user (e.g., lender, borrower) to input (e.g., type, drag-and-drop, or provide a file such as XLS, TXT, or CSV) information to the browser interface 502. A borrower may submit their information to a lender. In other examples, the borrower may submit the information to one or more lenders directly. The information may be submitted in a secure manner, such as using HTTPS or SSL. The information may also be encrypted (e.g., PgP encryption).

In some examples, batch interface 504 may allow a user to upload a file (e.g., XLS, TXT, or CSV) to the fraud detection computer system. The file may include information associated with one or more loan applications. In some examples, the batch interface 504 may utilize sFTP to send and receive communications. Scheduled batch interface 504 may also encrypt the file (e.g., PgP encryption).

In some examples, loan origination service 506 may be a service (e.g., a web service) that provides a direct connection with the fraud detection computer system (e.g., synchronous). The loan origination service 506 may operate on a borrower user device, a dealer user device, or a lender user device. The loan origination service 506 may generate an application object for information associated with a loan application, the application object directly used by the fraud detection computer system. The loan origination service 506 may then insert information into the application object. The loan origination service 506 may be a service that utilizes HTTP or SSL.

The fraud detection computer system may further include a group firewall 508. The group firewall 508 may include one or more security groups (e.g., security group with whitelist IP list 510 and LOS security group 512). In some examples, the group firewall 508 may be configured to determine whether to allow electronic communications that originate from outside of group firewall 508 to be delivered to a computer system or device inside group firewall 508.

Security group with whitelist IP list 510 may include one or more Internet protocol (IP) addresses that may be allowed to utilize processes described herein. For example, when a device executing a browser interface attempts to send borrower information, the IP address of the user device may be checked against whitelist IP list 510 to ensure that the user device has permission to utilize services described herein. In one illustrative example, a communication between browser interface and whitelist IP list 510 may be in the form of HTTPS. A similar process may occur when scheduled batch interface sends borrower user information or application data. In one example, an electronic communication between scheduled batch interface 504 and whitelist IP list 510 may be in the form of sFTP or PgP. Comparatively, the LOS security group 512 may manage security regarding the loan origination service 506 in a similar method as the security group with whitelist IP list 510.

Within the group firewall 508, the fraud detection computer system may include a virtual private cloud 520. The virtual private cloud 520 may host one or more services described herein. For example, the virtual private cloud 520 may host a file processing service. The file processing service may decrypt information received from the browser interface 502 or the batch interface 504, generate an application object (as described above), decrypt information that was previously encrypted for electronic communications, and/or insert the decrypted information into the application object.

Within the group firewall 508, the fraud detection computer system may include a private subnet 522. The private subnet 522 may include ASYNC service, SYNC service, scoring service, consortium database, or any combination thereof. ASYNC service and SYNC service may facilitate requests to be sent to scoring service 530. In particular, ASYNC service may be used for asynchronous communications, as described with the browser interface 502 and the batch interface 504. SYNC service may be used for synchronous communications, as described with the loan origination service 506.

The scoring service 530 may receive additional information from a consortium database. The additional information may include information not associated with the application. For example, the additional information may be associated with other applications to be used for comparison. In one illustrative example, consortium database may be a location where historical information related to one or more lenders is stored so it may be analyzed and used by scoring service 530. The scoring service 530 may calculate a first level score for a borrower user device and/or a second level score for a dealer user device.

The scoring service 530 may determine that a combination of elements may represent a likelihood of fraud. For example, identity elements associated with an application of a borrower user may be compared with and not match a third-party data source. The scoring service 530 may determine that the combination of those elements may be represent a potential synthetic or fake identity. As another example, a name and location may be provided to the scoring service 530. In such an example, the name and location may not have a social media profile, potentially indicating a synthetic identity risk. As another example, a phone number associated with a borrower user may be listed with the application data. The phone number may be compared with a third party data source and correspond with a different person than the person associated with the application. The scoring service 530 may determine that the mismatch user identifiers may represent a potential straw borrower or identity risk. As another example, an employer identifier may be input that does not match a list of existing employers from a secretary of state data source. As another example, an email address may be input that is associated with prior fraud from a third-party data source.

Figure 6:
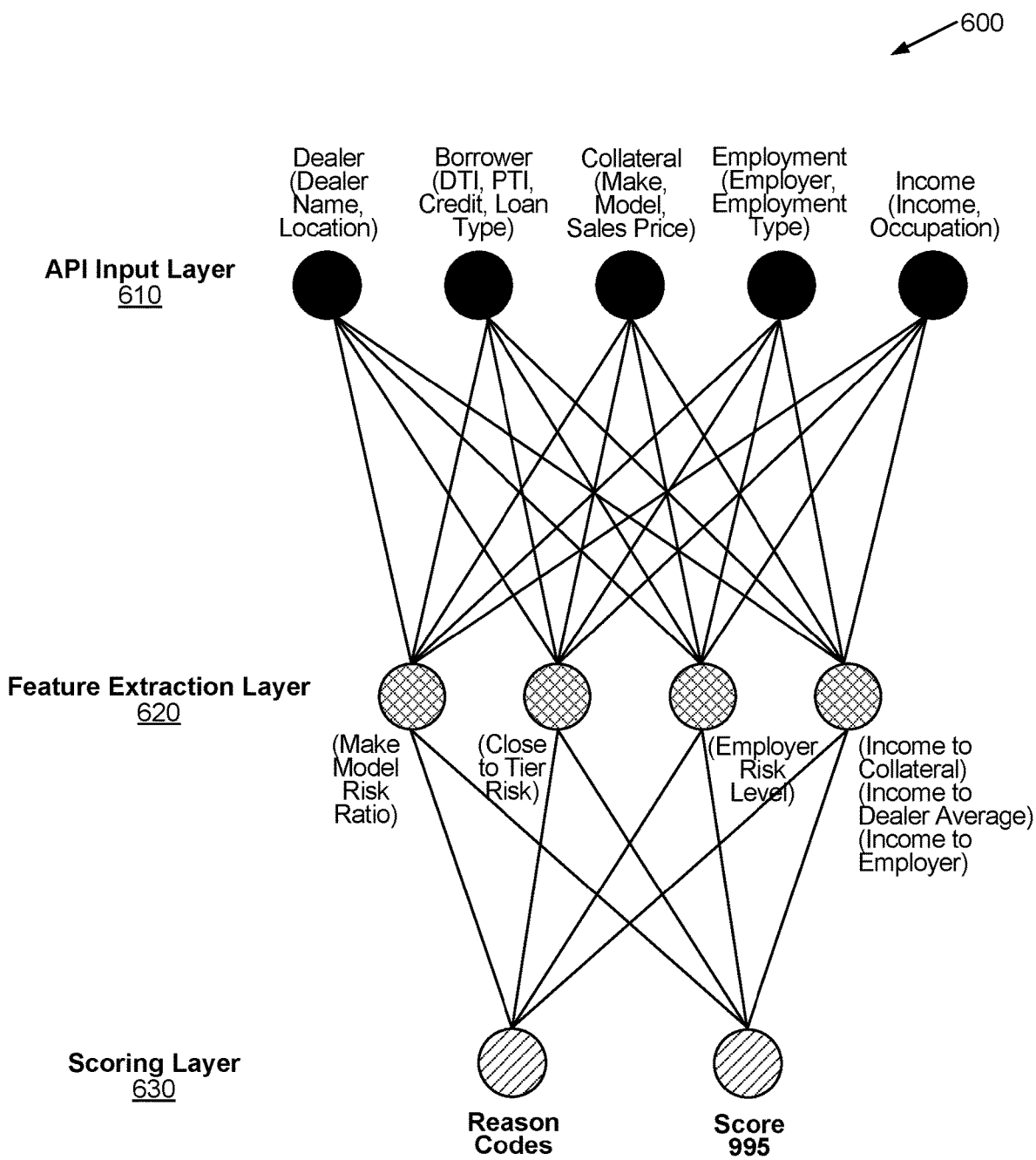
FIG. 6 illustrates a score process according to an embodiment of the disclosure.

FIG. 6 illustrates a score process according to an embodiment of the disclosure. In illustration 600, a sample process is illustrated to generate a score for an application. The diagram includes an API input layer 610, a feature extraction layer 620, and a scoring layer 630. The API input layer 610 may receive information extracted from or correlated with an application. Examples of such information include income of the borrower, an identification of an occupation of the borrower, employer of the borrower, employment type of the borrower, collateral information associated with collateral (e.g., if the collateral is a car, the collateral information may include make, model, or sales price), borrower information (e.g., DTI, PTI, credit, loan type, etc.), or dealer information (e.g., identification of a name or location of the dealer).

The API input layer 610 may transmit the information to the feature extraction layer 620. The feature extraction layer 620 may be configured to identify input features from the API input layer 610 and generate relationships and correlations between the data based on similarities, clusters, aggregation of the data, and the like. The feature extraction layer 620 may generate one or more input features from information received in the API input layer 620. Examples of features include income to collateral, income to dealer average, income to employer, employer risk level, close to tier risk, make model risk ratio, etc.

The feature extraction layer 620 may transmit the one or more features to the scoring layer 630. The scoring layer 630 may compute a score. In some examples, the scoring layer 630 may summarize a risk associated with an application or dealer user. The scoring layer 630 may utilize a trained machine learning (ML) model (e.g., pattern recognition model, neural network, decision tree, clustering, etc.) to compute the score. Input to the scoring layer 630 may include one or more features and/or information received in the API input layer 610. In one illustrative example, the score may range from 1 (low risk) to 999 (high risk). However, it should be recognized that the score may be in a different form.

The scoring layer 630 may also determine one or more reason codes. A reason code may correspond with one or more features that are determined to contribute to the application score. One or more actions may also be determined. The one or more actions may be determined based upon the one or more reason codes, the application score, and/or the information received in the API input layer 610. Information associated with the scoring layer 630 may be provided to the dealer user device or the lender user device, including one or more application scores, one or more reason codes, and one or more actions.

FIG. 7 illustrates a report for indicating a score according to an embodiment of the disclosure. In illustration 700, the report may include a score for a loan application from a lender user device. The report may comprise application data, including an application ID, location associated with the loan application, loan amount, loan term, car make, car model, dealer ID, and the like.

The report further includes a score (illustrated as score "998"), which may be calculated as described above. The report may further include a risk level (illustrated as "high"). The risk level may be determined by comparing the score to one or more thresholds. For example, if the score is above the threshold, a risk level of "high" may be determined. If the score is below the threshold, a risk level of "low" may be determined. Each threshold may be associated with a different level of risk (e.g., low, medium, and high). When there are more than one threshold, a threshold may be defined as between two thresholds.

The report further includes reason codes. A reason code may comprise information corresponding to a feature that contributes above a particular threshold to the score. An example of a reason code is that the car dealer is located a significant distance from the borrower address.

The application report may further include actions. An action may be mapped to a reason code. In some examples, the action may suggest an action for a party of the loan application to perform to increase the likelihood that the loan application is not fraudulent.

The application report may further include features. In some examples, the features may be categorized, such as borrower attributes, loan attributes, and dealer attributes. Examples of borrower attributes include credit score, income, employer, whether the borrower is self-employed, whether there is a cosigner, an age of oldest trade, and a high credit amount. Examples of loan attributes include loan-to-value ratio (LTV), a mortgage payment that is the sum of monthly principal, interest, taxes, and insurance (PITI), debt-to-income ratio (DTI), an amount of cash down, car purchased, purchase price. Examples of dealer attributes include dealer name, whether the dealer name has been matched to a dealer stored by a fraud management system, a dealer risk level, a dealer volume, an average credit score, or whether a risk is reported in consortium. It should be recognizes that other categories and other attributes may be used.

Figure 8:
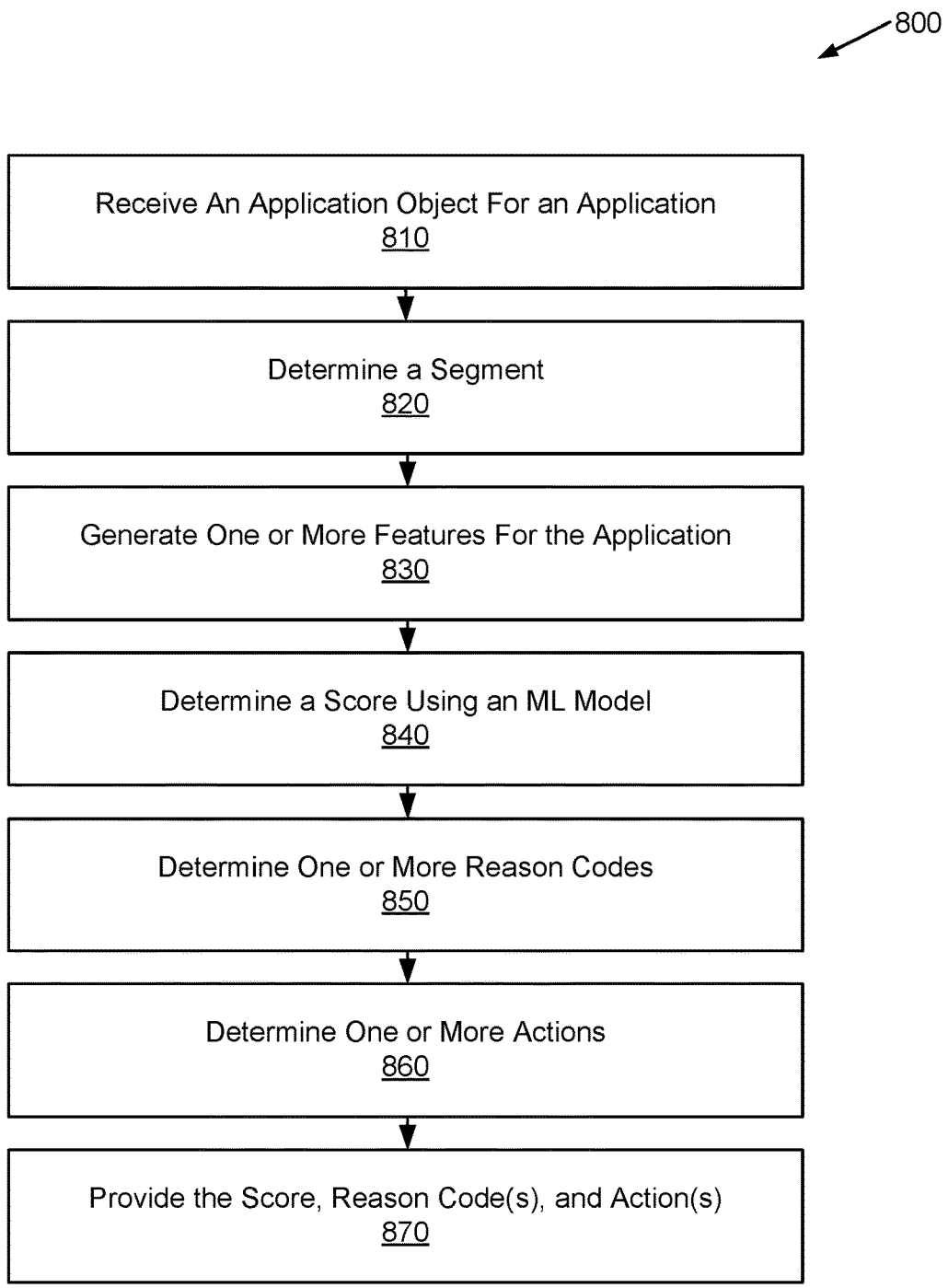
FIG. 8 illustrates a sample method of computing a score at a first level for an application according to an embodiment of the disclosure.

FIG. 8 illustrates a sample method of computing a score at a first level for an application according to an embodiment of the disclosure. In illustration 800, a scoring service or other computer system may perform the process described herein.

Illustration 800 may be performed under the control of one or more computer systems configured with executable instructions and may be implemented as one or more computer programs or applications executing collectively on one or more processors, by hardware or software. The could they be stored on a computer readable storage medium, for example, in the form of computer program comprising a plurality of instructions executable by one or more processors the computer readable storage media may be non-transitory.

At 810, an application object for an application may be received. For example, the computer system may receive the application object via a network communication protocol. The application object may include first information associated with a first borrower user device, where the first information is provided by the first device for the application. The application may be associated with a request from the first borrower user device at a second dealer user device or a third lender user device. The application may be received in a payload of a Hypertext Transfer Protocol (HTTP) message.

Additional information associated with the application, second dealer user device, or third lender user device may be identified. The information may be included in the application object. In some examples, the information may be received in response to selection of a user-selectable option on a web page, where selection of the user-selectable option is indicative of a submission of the application by the second device. In some examples, a feature may be generated based upon the application data or information. The information may be received from a consortium database or a third-party data store. The information may be included with the application object.

At 820, a segment may be determined. For example, the computer system may determine a segment associated with the first information of the application object. The segment may identify a grouping associated with the application. In some examples, the segment may help identify and determine a corresponding ML model for the application data.

At 830, one or more features may be generated for the application. For example, the computer system may generate an input feature based at least in part on the first information, borrower user device, dealer user device, lender user device, or the application data. In some examples, a feature may be based upon information associated with one or more user devices other than these devices.

At 840, a score may be determined for the application. For example, the computer system may determine the application score for the application. The application score may be selected from a plurality of application scores. The application score may be determined by applying the one or more input features associated with the application to the trained ML model. In some examples, the application score may be determined based upon a pattern recognition model using the one or more features as input. The pattern recognition model may be trained based upon previous applications. In some examples, the pattern recognition model may be trained such that each feature has a weight computed for the feature.

At 850, one or more reason codes may be determined for the application. For example, the computer system may determine the reason codes based on the first information, borrower user device, dealer user device, lender user device, or the application data. A reason code may indicate information contributing to the application score.

At 860, one or more actions may be determined for application. For example, the computer system may determine the one or more actions based on the first information, borrower user device, dealer user device, lender user device, or the application data.

At 870, the application score may be provided. For example, the computer system may provide the application score, one or more reason codes, and the one or more actions via a network to a user device. In some examples, the user device may include the dealer user device or the lender user device.

Figure 9:
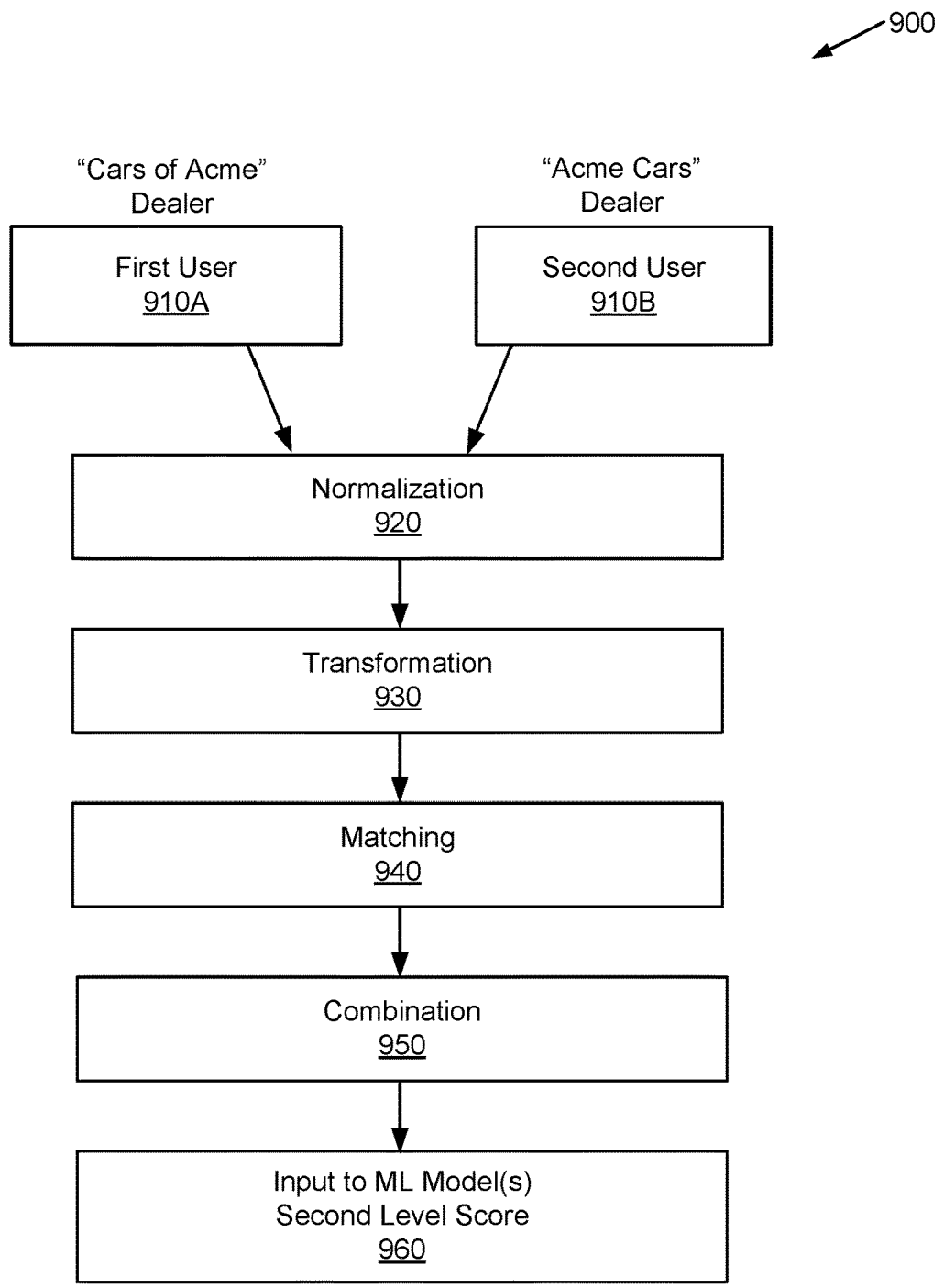
FIG. 9 illustrates a fraud detection and risk analysis process implemented by a distributed system according to an embodiment of the disclosure.

FIG. 9 illustrates a fraud detection and risk analysis process implemented by a distributed system according to an embodiment of the disclosure. In illustration 900, a fraud detection computer system 120 of FIG. 1 may perform the described process by implementing one or more modules (e.g., including the interface engine 132, the user module 134, the application engine 136, the profiling module 138, the discrepancy module 140, the fraud scoring engine 142, the code module 144, and/or the action engine 146) to perform these and other actions.

Illustration 900 may be performed under the control of one or more computer systems configured with executable instructions and may be implemented as one or more computer programs or applications executing collectively on one or more processors, by hardware or software. The could they be stored on a computer readable storage medium, for example, in the form of computer program comprising a plurality of instructions executable by one or more processors the computer readable storage media may be non-transitory.

A plurality of applications may be received by the fraud detection computer system 120 from a plurality of dealer user devices, including application data associated with a first user 910A and application data associated with a second user 910B (in combination, referred to as "users 910"). In this illustration, the dealer user names may be similar in each application. For example, the first user 910A may correspond with "Cars of Acme" dealer name and the second user 910B may correspond with "Acme Cars" dealer name.

The fraud detection computer system 120 may implement a normalization process 920 using information corresponding with users 910 as input. For example, the fraud detection computer system 120 may normalize the impact by removing periods, spaces, or capitalization of characters to form a string of text associated with the dealer user.

The fraud detection computer system 120 may implement a transformation process 930 using the output of the normalization process 920 as input. For example, the fraud detection computer system 120 may transform this data by removing generic words including "a" or "the." In another example, the transformation process may add the word "and" in place of an "&" (ampersand).

The fraud detection computer system 120 may implement a matching process 940 using the output of the transformation process 930 as input. For example, the fraud detection computer system 120 may match (e.g., tiered matching process, or fuzzing matching, etc.) one or more users by one or more fields of data. For example, the fields may comprise a dealer name, street address, ZIP Code, state, and phone number. The matching process may receive a first dealer name and compare the first dealer name with all other users 910. The users 910 corresponding with matched data fields may be grouped to form a plurality of clusters. In some examples, multiple data fields may be matched to form clusters of data that are more closely related.

The fraud detection computer system 120 may implement a combination process 950 using the output of the matching process 940 as input. For example, the fraud detection computer system 120 may measure a field distance between fields of the plurality of clusters. When the similarities are detected above a similarity threshold (e.g., 90 out of 100 potential match score), the users may be aggregated to identify a single dealer user (e.g., a dealer user associated with "Acme"). The single dealer user may be assigned a new dealer user identifier to correspond with the combined data records.

Application scores corresponding with this aggregated dealer user information may also be identified. For example, an average application score for the dealer user may be identified to correspond with the applications submitted from a plurality of borrower user devices associated with the dealer user. The average application score may be based at least in part on historical averages of features of the plurality of applications associated with the dealer user device. In some examples, a maximum or other mathematical determination associated with the application scores may be determined. In some examples, multiple application scores may be provided in association with the dealer user, such that the application scores may not be combined.

The fraud detection computer system 120 may apply the output of the aggregation process 950 as input to the ML model. For example, multiple application scores may correspond with an input feature to determine a likelihood of fraud associated with the dealer user. In some examples, the number of application scores above a score threshold (e.g., high risk) may be compared to a risk threshold (e.g., more than half). The output of the ML model may determine a score corresponding with the dealer user and/or other information described herein.

FIG. 10 illustrates a report for indicating a score according to an embodiment of the disclosure. In illustration 1000, the report may include a score for a dealer user associated with a lender user. The report may comprise aggregated application data and/or application scores by dealer identifier. The report may also comprise dealer information associated with a loan application, including dealer ID, dealer name, location associated with the dealer, a phone number for the dealer, a volume of applications for the domain in a particular amount of time.

The dealer report further includes a second level score (e.g., "997"), which may be calculated as described herein. The application report may further include a risk level (e.g., "high"). The risk level may be determined by comparing the second level score to one or more thresholds, each threshold associated with a different level of risk (e.g., high, medium, and low).

The application report further includes reason codes for the dealer. A reason code may indicate information associated with a feature that may contribute to the application score. The reason codes may be determined based upon features determined for the dealer that contribute most to the application score. The reason codes may be filtered and provided according to features that cause the application score to increase the greatest amount when compared to other reason codes. For example, a fraud rate may be identified with applications originating from the particular dealer user. When the fraud rate is higher than a threshold value (e.g., a national average, or an average for similar dealer users, etc.), the fraud rate may cause the application score to increase at a greater rate. The reason code associated with the fraud rate may be identified on the application report as well.

The application report may further include attributes that were used to compute the application score. In some examples, the attributes may be separated into multiple categories, such as application scores/key metrics attributes, key dealer ratios attributes, known performance attributes. Examples of application scores/key metrics include average fraud score, average credit score, average amount financed, average down payment percent, total number of applications, approved percent, declined percent, and percent of booked loans. Examples of key dealer ratios include average loan-to-value, average loan-to-interest, average income, average loan term, common employer phone percent, co-borrower percent, velocity (e.g., a rate at which a dealer user submits applications), and average annual percentage rate. Examples of known performance include fraud reported in network, total reported frauds loans, total reported early payment default (EPD) loans, total fraud rate, total EPD rate, fraud risk level. EPD risk level, and consumer review rating. However, it should be recognized that other categories and other attributes may be used.

Figure 11:
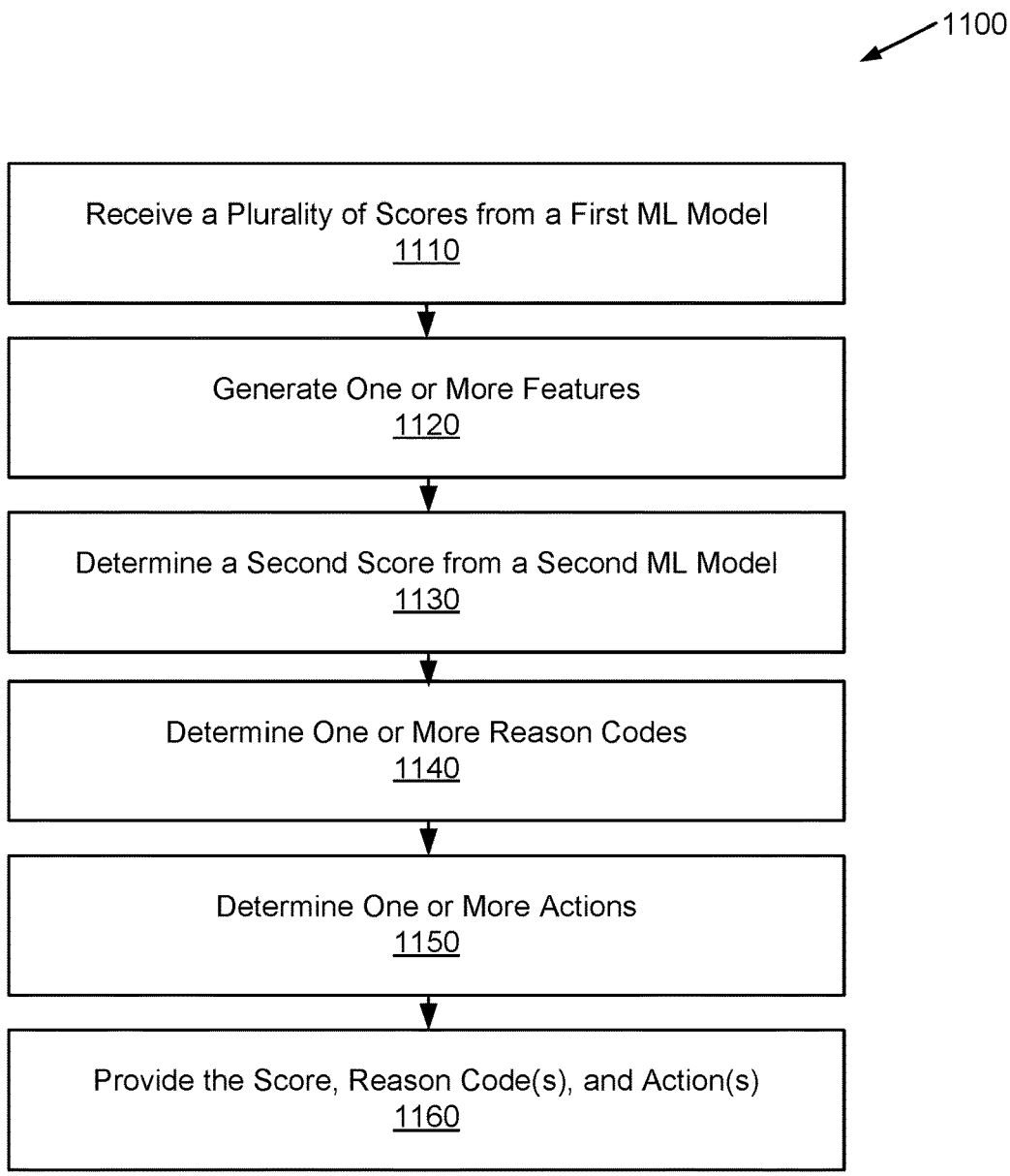
FIG. 11 illustrates a sample method of computing a score at a second level according to an embodiment of the disclosure.

FIG. 11 illustrates a sample method of computing a score at a second level according to an embodiment of the disclosure. In illustration 1100, a fraud detection computer system 120 of FIG. 2 may perform the described process by implementing one or more modules (e.g., including the interface engine 132, the user module 134, the application engine 136, the profiling module 138, the discrepancy module 140, the fraud scoring engine 142, the code module 144, and/or the action engine 146) to perform these and other actions.

Illustration 1100 may be performed under the control of one or more computer systems configured with executable instructions and may be implemented as one or more computer programs or applications executing collectively on one or more processors, by hardware or software. The could they be stored on a computer readable storage medium, for example, in the form of computer program comprising a plurality of instructions executable by one or more processors the computer readable storage media may be non-transitory.

At 1110, a plurality of application scores may be received from a first ML model. For example, the fraud detection computer system 120 may receive a plurality of application scores for a plurality of applications as output from a first trained ML model. The plurality of applications may include first information associated with the plurality of borrower devices. The plurality of applications may be exchanged between the plurality of borrower devices and a dealer user device 112.

At 1120, one or more input features may be generated. For example, the fraud detection computer system 120 may generate one or more input features in association with the plurality of applications.

At 1130, a second score may be determined from a second ML model. For example, the fraud detection computer system 120 may determine a second score associate with the plurality of application scores. The second score may be selected from a plurality of second scores (e.g., ranging between one and 999, etc.). In some examples, determining the second score may comprise applying the one or more input features associated with the plurality of applications to the second ML model.

In some examples, the second score determined based upon a pattern recognition ML model. For example, the pattern recognition ML model may be a scorecard model that may be driven by historical application scores observed for the dealer user device. The process of updating the second score may occur after each application is associated with a first score so that the second score is immediately available for subsequent applications.

At 1140, one or more reason codes may be determined. For example, the fraud detection computer system 120 may determine one or more reason codes for the plurality of applications based at least in part on the second score.

At 1150, one or more actions may be determined. For example, the fraud detection computer system 120 may determine one or more actions for the plurality of applications based at least in part on the second score.

At 1160, the application score, reason code(s), and action (s) may be provided. For example, the fraud detection computer system 120 may provide the second score, the one or more reason codes, and the one or more actions to the dealer user device or a lender user device via a communication network.

In some examples, the second score may be provided as input to compute a first score for a future application associated with a borrower user device. In other examples, the second score may be provided in a dealer user report, as illustrated with FIG. 10. The report may be used to determine a likelihood that an application associated with the dealer user includes a likelihood of fraud.

Figure 12:
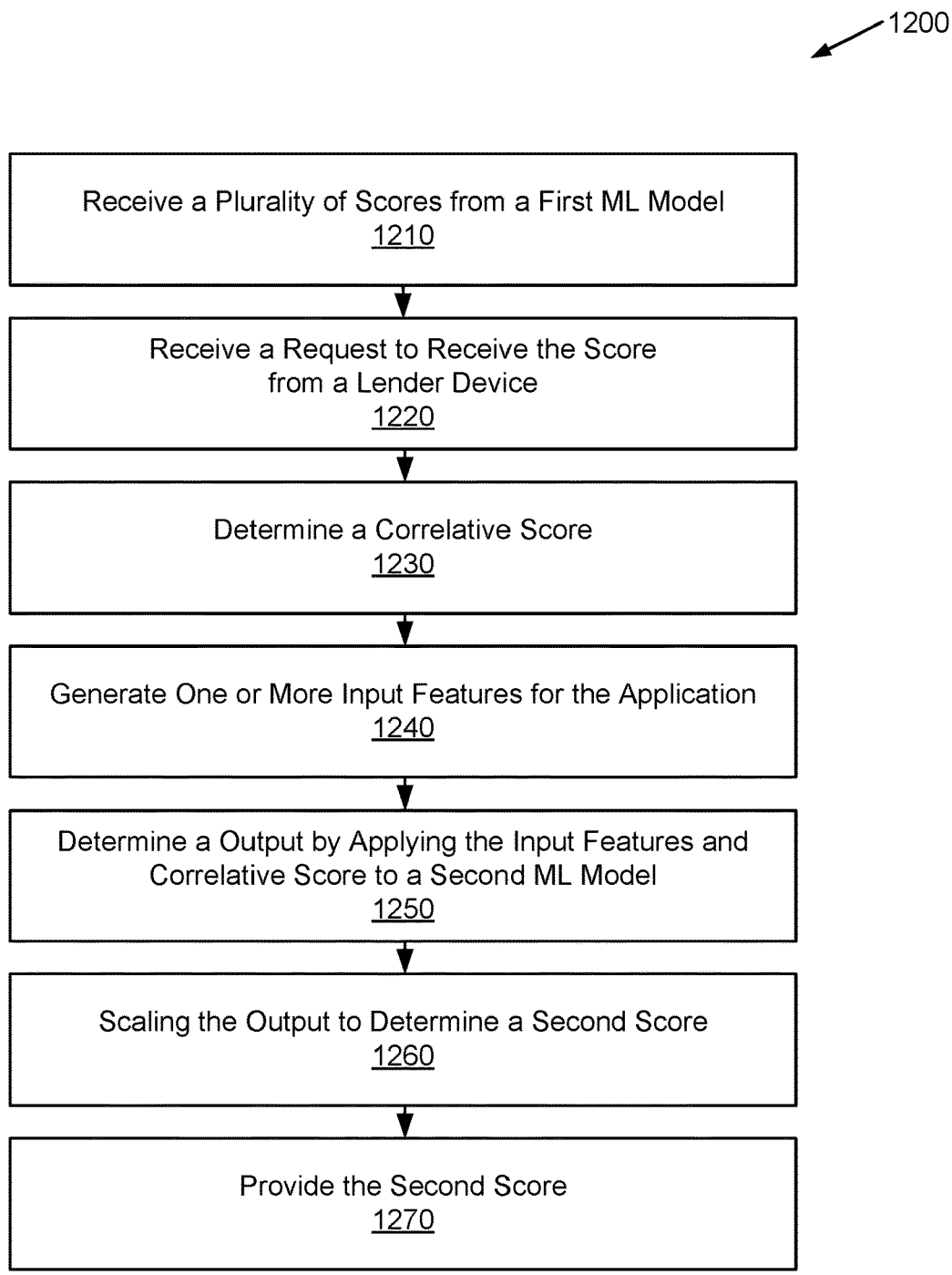
FIG. 12 illustrates a sample method of computing a score at a second level according to an embodiment of the disclosure.

FIG. 12 illustrates a sample method of computing a score at a second level according to an embodiment of the disclosure. In illustration 1200, a fraud detection computer system 120 of FIG. 1 may perform the described process by implementing one or more modules (e.g., including the interface engine 132, the user module 134, the application engine 136, the profiling module 138, the discrepancy module 140, the fraud scoring engine 142, the code module 144, and/or the action engine 146) to perform these and other actions.

Illustration 1200 may be performed under the control of one or more computer systems configured with executable instructions and may be implemented as one or more computer programs or applications executing collectively on one or more processors, by hardware or software. The could they be stored on a computer readable storage medium, for example, in the form of computer program comprising a plurality of instructions executable by one or more processors the computer readable storage media may be non-transitory.

At 1210, a plurality of application scores may be received. For example, the fraud detection computer system 120 may receive a plurality of first scores for a plurality of applications. The plurality of applications may include first information associated with a plurality of borrower user devices. The plurality of first scores may be output from the first trained ML model.

At 1220, a request to receive a score may be received from a lender device. For example, the fraud detection computer system 120 may receive a request from the lender device via an application programming interface (API) or other interface described in the disclosure. In some examples, the fraud detection computer system 120 may receive a request to receive the application score. The request may originate from the lender user device and, in some examples, may include a user identifier associated with the lender user device.

At 1230, a correlative score may be determined. For example, the fraud detection computer system 120 may determine a correlative score for each of the plurality of applications. The correlative score for each of the plurality of applications may identify a link between a dealer user device and a lender user device. In some examples, applications corresponding with a dealer user and a lender user may be clustered or combined to identify application data that corresponds with the linked entities.

At 1240, one or more input features may be generated. For example, the fraud detection computer system 120 may generate one or more input features in association with the plurality of applications.

At 1250, a plurality of second scores may be determined from a second ML model. For example, the fraud detection computer system 120 may determine a plurality of second scores by applying one or more input features associated with the plurality of applications and the correlative score to a second trained ML model. The output may correspond with the dealer user device and the lender user device associated with the request.

At 1260, the output may be scaled. For example, the fraud detection computer system 120 may scale the output from the trained ML model to a range of scores to determine the relative risk associated with the particular dealer user and lender user that requested the score. In some examples, the output may identify a likelihood of fraud in an application submitted between a first dealer device and a first lender device. The likelihood of fraud may be codified as a second score. The likelihood of fraud may be identified by comparing application scores associated with historical application data to a score threshold.

At 1270, the second score may be provided. For example, the fraud detection computer system 120 may provide the score to the lender device. The score may correspond with the lender user device and the dealer user device associated with the application data that provided the input to the ML model to generate the score(s).

Figure 13:
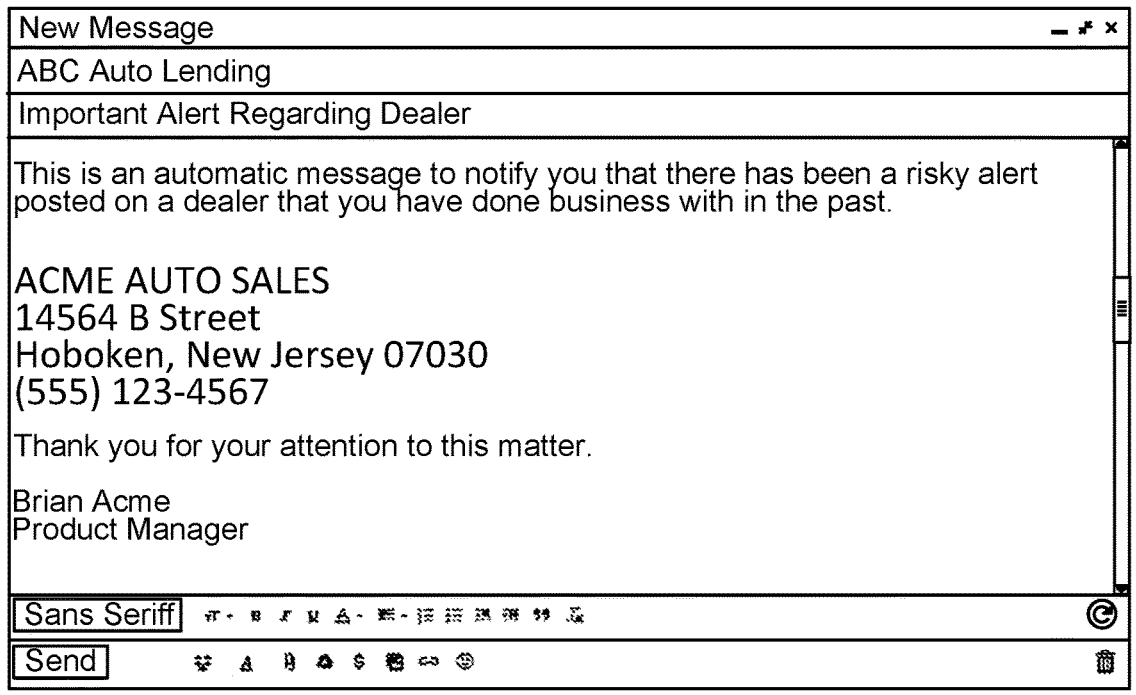
FIG. 13 illustrates a notification according to an embodiment of the disclosure.

FIG. 13 illustrates a notification according to an embodiment of the disclosure. In illustration 1300, an example electronic communication may include information associated with a dealer user associated with a likelihood of fraud. Additional information may include a score, risk code, or suggested actions. The notification may be transmitted as an electronic communication via a communication protocol to a lender user device.

Figure 14:
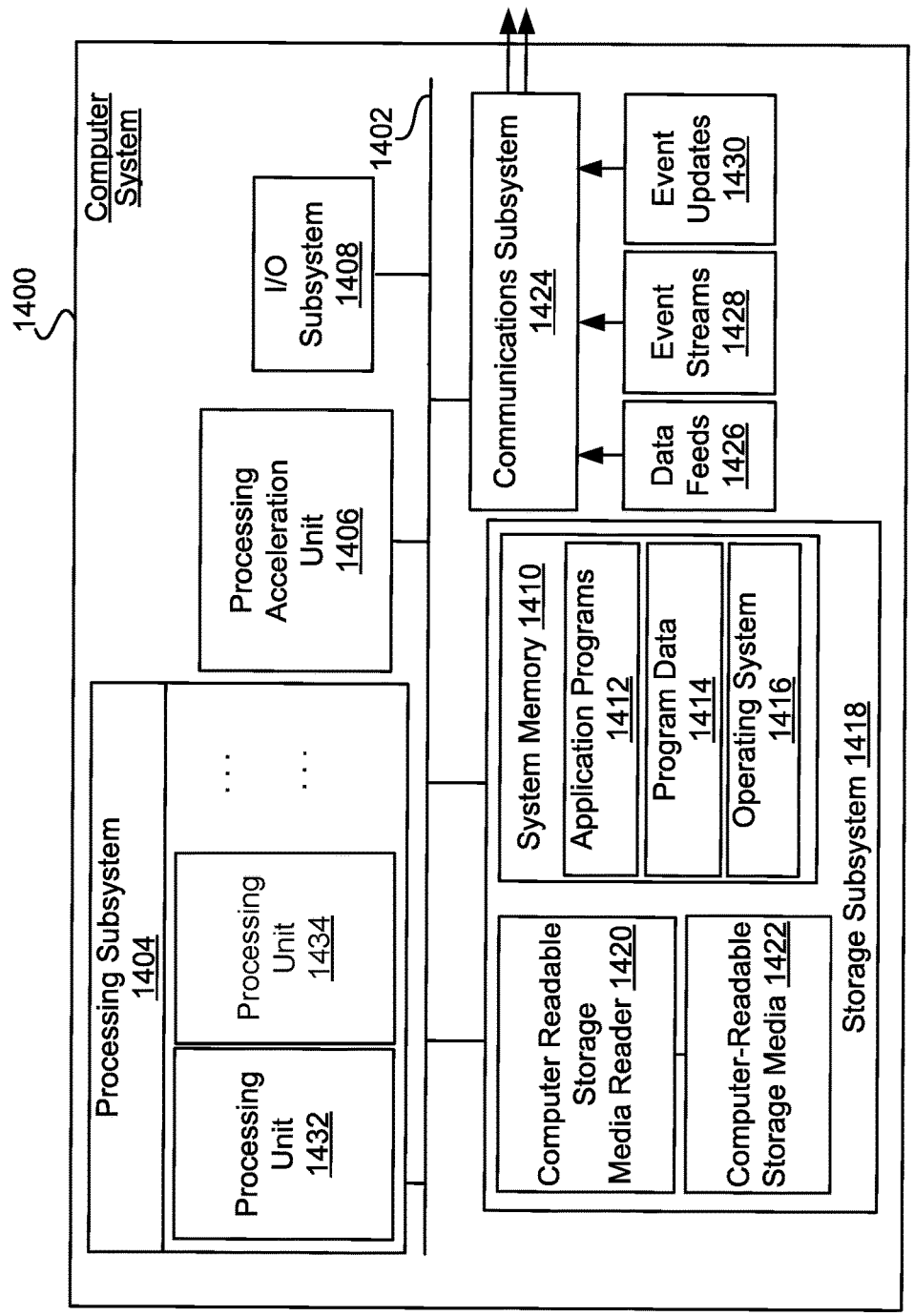
FIG. 14 illustrates an example of a computer system that may be used to implement certain embodiments of the disclosure.

FIG. 14 illustrates an example of a computer system that may be used to implement certain embodiments of the disclosure. For example, in some embodiments, computer system 1400 may be used to implement any of the systems, servers, devices, or the like described above.

As shown in FIG. 14, computer system 1400 includes processing subsystem 1404, which communicates with a number of other subsystems via bus subsystem 1402. These other subsystems may include processing acceleration unit 1406, I/O subsystem 1408, storage subsystem 1418, and communications subsystem 1424. Storage subsystem 1418 may include non-transitory computer-readable storage media including storage media 1422 and system memory 1410.

Bus subsystem 1402 provides a mechanism for allowing the various components and subsystems of computer system 1400 to communicate with each other. Although bus subsystem 1402 is shown schematically as a single bus, alternative embodiments of bus subsystem 1402 may utilize multiple buses. Bus subsystem 1402 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 1404 controls the operation of computer system 1400 and may comprise one or more processors, application specific integrated circuits (ASICs), or field programmable gate arrays (FPGAs). The processors may include single core and/or multicore processors. The processing resources of computer system 1400 may be organized into one or more processing units 1432, 1434, etc. A processing unit may include one or more processors, one or more cores from the same or different processors, a combination of cores and processors, or other combinations of cores and processors. In some embodiments, processing subsystem 1404 may include one or more special purpose co-processors such as graphics processors, digital signal processors (DSPs), or the like. In some embodiments, some or all of the processing units of processing subsystem 1404 may be implemented using customized circuits, such as application specific integrated circuits (ASICs), or field programmable gate arrays (FPGAs).

In some embodiments, the processing units in processing subsystem 1404 may execute instructions stored in system memory 1410 or on computer readable storage media 1422. In various embodiments, the processing units may execute a variety of programs or code instructions and may maintain multiple concurrently executing programs or processes. At any given time, some or all of the program code to be executed may be resident in system memory 1410 and/or on computer-readable storage media 1422 including potentially on one or more storage devices. Through suitable programming, processing subsystem 1404 may provide various functionalities described above. In instances where computer system 1400 is executing one or more virtual machines, one or more processing units may be allocated to each virtual machine.

In certain embodiments, processing acceleration unit 1406 may optionally be provided for performing customized processing or for off-loading some of the processing performed by processing subsystem 1404 so as to accelerate the overall processing performed by computer system 1400.

I/O subsystem 1408 may include devices and mechanisms for inputting information to computer system 1400 and/or for outputting information from or via computer system 1400. In general, use of the term input device is intended to include all possible types of devices and mechanisms for inputting information to computer system 1400. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices that enable users to control and interact with an input device and/or devices that provide an interface for receiving input using gestures and spoken commands. User interface input devices may also include eye gesture recognition devices that detects eye activity (e.g., "blinking" while taking pictures and/or making a menu selection) from users and transforms the eye gestures as inputs to an input device. Additionally, user interface input devices may include voice recognition sensing devices that enable users to interact with voice recognition systems through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1400 to a user or other computer system. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1418 provides a repository or data store for storing information and data that is used by computer system 1400. Storage subsystem 1418 provides a tangible non-transitory computer-readable storage medium for storing the basic programming and data constructs that provide the functionality of some embodiments. Storage subsystem 1418 may store software (e.g., programs, code modules, instructions) that, when executed by processing subsystem 1404, provides the functionality described above. The software may be executed by one or more processing units of processing subsystem 1404. Storage subsystem 1418 may also provide a repository for storing data used in accordance with the teachings of this disclosure.

Storage subsystem 1418 may include one or more non-transitory memory devices, including volatile and non-volatile memory devices. As shown in FIG. 14, storage subsystem 1418 includes system memory 1410 and computer-readable storage media 1422. System memory 1410 may include a number of memories, including (1) a volatile main random access memory (RAM) for storage of instructions and data during program execution and (2) a non-volatile read only memory (ROM) or flash memory in which fixed instructions are stored. In some implementations, a basic input/output system (BIOS), including the basic routines that help to transfer information between elements within computer system 1400, such as during start-up, may typically be stored in the ROM. The RAM typically includes data and/or program modules that are presently being operated and executed by processing subsystem 1404. In some implementations, system memory 1410 may include multiple different types of memory, such as static random access memory (SRAM), dynamic random access memory (DRAM), and the like.

By way of example, and not limitation, as depicted in FIG. 14, system memory 1410 may load application programs 1412 that are being executed, which may include various applications such as Web browsers, mid-tier applications, relational database management systems (RDBMS), etc., program data 1414, and operating system 1416.

Computer-readable storage media 1422 may store programming and data constructs that provide the functionality of some embodiments. Computer-readable media 1422 may provide storage of computer-readable instructions, data structures, program modules, and other data for computer system 1400. Software (programs, code modules, instructions) that, when executed by processing subsystem 1404 provides the functionality described above, may be stored in storage subsystem 1418. By way of example, computer-readable storage media 1422 may include non-volatile memory such as a hard disk drive, a magnetic disk drive, an optical disk drive such as a CD ROM. DVD, a Blu-Ray® disk, or other optical media. Computer-readable storage media 1422 may include, but is not limited to, Zip® drives, flash memory cards, universal serial bus (USB) flash drives, secure digital (SD) cards. DVD disks, digital video tape, and the like. Computer-readable storage media 1422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM. DRAM-based SSDs, magnetoresistive RAM (MRAM) SSDs. and hybrid SSDs that use a combination of DRAM and flash memory based SSDs.

In certain embodiments, storage subsystem 1418 may also include computer-readable storage media reader 1420 that may further be connected to computer-readable storage media 1422. Reader 1420 may receive and be configured to read data from a memory device such as a disk, a flash drive, etc.

In certain embodiments, computer system 1400 may support virtualization technologies, including but not limited to virtualization of processing and memory resources. For example, computer system 1400 may provide support for executing one or more virtual machines. In certain embodiments, computer system 1400 may execute a program such as a hypervisor that facilitated the configuring and managing of the virtual machines. Each virtual machine may be allocated memory, compute (e.g., processors, cores). I/O, and networking resources. Each virtual machine generally runs independently of the other virtual machines. A virtual machine typically runs its own operating system, which may be the same as or different from the operating systems executed by other virtual machines executed by computer system 1400. Accordingly, multiple operating systems may potentially be run concurrently by computer system 1400.

Communications subsystem 1424 provides an interface to other computer systems and networks. Communications subsystem 1424 serves as an interface for receiving data from and transmitting data to other systems from computer system 1400. For example, communications subsystem 1424 may enable computer system 1400 to establish a communication channel to one or more client devices via the Internet for receiving and sending information from and to the client devices.

Communication subsystem 1424 may support both wired and/or wireless communication protocols. For example, in certain embodiments, communications subsystem 1424 may include radio frequency (RF) transceiver components for accessing wireless voice and/or data networks (e.g., using cellular telephone technology, advanced data network technology, such as 3G, 4G or EDGE (enhanced data rates for global evolution). WiFi (IEEE 802.XX family standards, or other mobile communication technologies, or any combination thereof), global positioning system (GPS) receiver components, and/or other components. In some embodiments, communications subsystem 1424 may provide wired network connectivity (e.g., Ethernet) in addition to or instead of a wireless interface.

Communication subsystem 1424 may receive and transmit data in various forms. For example, in some embodiments, in addition to other forms, communications subsystem 1424 may receive input communications in the form of structured and/or unstructured data feeds 1426, event streams 1428, event updates 1430, and the like. For example, communications subsystem 1424 may be configured to receive (or send) data feeds 1426 in real-time from users of social media networks and/or other communication services such as web feeds and/or real-time updates from one or more third party information sources.

In certain embodiments, communications subsystem 1424 may be configured to receive data in the form of continuous data streams, which may include event streams 1428 of real-time events and/or event updates 1430, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1424 may also be configured to communicate data from computer system 1400 to other computer systems or networks. The data may be communicated in various different forms such as structured and/or unstructured data feeds 1426, event streams 1428, event updates 1430, and the like to one or more databases that may be in communication with one or more streaming data source computers coupled to computer system 1400.

Computer system 1400 may be one of various types, including a handheld portable device, a wearable device, a personal computer, a workstation, a mainframe, a kiosk, a server rack, or any other data processing system. Due to the ever-changing nature of computers and networks, the description of computer system 1400 depicted in FIG. 14 is intended only as a specific example. Many other configurations having more or fewer components than the system depicted in FIG. 14 are possible. Based on the disclosure and teachings provided herein, a person of ordinary skill in the art will appreciate other ways and/or methods to implement the various embodiments.

In the preceding description, for the purposes of explanation, specific details are set forth in order to provide a thorough understanding of examples of the disclosure. However, it should be apparent that various examples may be practiced without these specific details. For example, circuits, systems, networks, processes, and other components may be shown as components in block diagram form in order to not obscure the examples in unnecessary detail. In other instances, well-known circuits, processes, algorithms, structures, and techniques may have been shown without necessary detail in order to avoid obscuring the examples. The figures and description are not intended to be restrictive.

The description provides examples only, and is not intended to limit the scope, applicability, or configuration of the disclosure. Rather, the description of the examples provides those skilled in the art with an enabling description for implementing an example. It should be understood that various changes may be made in the function and arrangement of elements without departing from the spirit and scope of the disclosure as set forth in the appended claims.

Also, it is noted that individual examples may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The term "machine-readable storage medium" or "computer-readable storage medium" includes, but is not limited to, portable or non-portable storage devices, optical storage devices, and various other mediums capable of storing, including, or carrying instruction(s) and/or data. A machine-readable storage medium or computer-readable storage medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. One or more processors may execute the software, firmware, middleware, microcode, the program code, or code segments to perform the necessary tasks.

Systems depicted in some of the figures may be provided in various configurations. In some embodiments, the systems may be configured as a distributed system where one or more components of the system are distributed across one or more networks such as in a cloud computing system.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The terms and expressions that have been employed in this disclosure are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although certain concepts and techniques have been specifically disclosed, modification and variation of these concepts and techniques may be resorted to by those skilled in the art, and that such modifications and variations are considered to be within the scope of the systems and methods as defined by this disclosure.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented as a computer program product including computer program code or instructions executable by one or more processors for performing any or all of the steps, operations, or processes described in this disclosure, where the computer program may be stored on a non-transitory computer readable medium. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method for computing an application score, the method comprising:
   receiving an application for loan from each of a plurality of borrowers via at least one of a plurality of borrower user devices, each application comprising application data;
   generating features from the applications for each of the borrowers;
   generating with a first machine learning ("ML") model a score characterizing a lending risk for each of the plurality of borrowers, wherein the first ML model is iteratively trained with adjusted weight input features;
   identifying applications and scores from the first ML model associated with a common dealer user device, wherein identifying comprises:
      normalizing character strings associated with each application and identifying the dealer user device;
      generating a modified character string for each of the applications, wherein generating a modified character string comprises removing characters forming generic words from the normalized character string;
      generating clusters of the modified character strings; and
      determining a common dealer for a set of applications based on a field distance between fields of a plurality of clusters;
   receiving, by a computer system, the plurality of scores corresponding with the set of applications for a common dealer, wherein the applications are exchanged between the plurality of borrower user devices and a dealer user device;
   generating, by the computer system, one or more input features associated with the applications;
   determining, by the computer system, a second score associated with the plurality of scores, wherein the second score corresponds with a collective risk associated with the dealer user device, and wherein determining the second score comprises applying the one or more input features and the plurality of scores associated with the applications to a second trained ML model;
   determining, by the computer system, one or more reason codes for the applications based at least in part on the second score;
   determining, by the computer system, one or more actions for the applications based at least in part on the second score; and
   providing, by the computer system, the second score, the one or more reason codes, and the one or more actions to the dealer user device or a lender user device.

2. The method of claim 1, wherein the character strings associated with each application comprise a first dealer user name and a second dealer user name, and wherein determining a common dealer comprising aggregating the application data relating to the common dealer, the identifying further comprising:
   providing the aggregated application data as input to the second trained ML model.

3. The method of claim 1, wherein the second score is based at least in part on a historical features for the applications associated with the dealer user device.

4. The method of claim 1, wherein the one or more input features correspond with one or more weights, and the further comprising:
   adjusting the one or more weights of the one or more input features based at least in part on a comparison to a current time, wherein more recent features have greater weight than less recent features.

5. The method of claim 1, further comprising:
   determining a risk profile;
   comparing the risk profile to the application data; and upon identifying a similarity feature between the risk profile and the application data, submitting the similarity feature to the second trained ML model.

6. The method of claim 1, wherein the first ML model is trained using a training data set of historical application data.

7. A non-transitory computer-readable storage medium storing a plurality of instructions executable by one or more processors, the plurality of instructions when executed by the one or more processors cause the one or more processors to:
receive an application for loan from each of a plurality borrowers via at least one of a plurality of borrower user devices, each application comprising application data;
generate features from the applications for each of the borrowers;
generate with a first machine learning ("ML") model a score characterizing a lending risk for each of the plurality of borrowers, wherein the first ML model is iteratively trained with adjusted weight input features;
identify applications and scores from the first ML model associated with a common dealer user device, wherein identifying comprises:
normalizing character strings associated with each application and identifying the dealer user device;
generating a modified character string for each of the applications, wherein generating a modified character string comprises removing characters forming generic words from the normalized character string;
generating clusters of the modified character strings; and
determining a common dealer for a set of applications based on a field distance between fields of a plurality of clusters;
receive the plurality of scores for the set of applications for a common dealer, wherein the applications are exchanged between the plurality of borrower user devices and a dealer user device;
generate one or more input features associated with the applications;
determine a second score associated with the plurality of scores, wherein the second score corresponds with a collective risk associated with the dealer user device, and wherein determining the second score comprises applying the one or more input features and the plurality of scores associated with the applications to a second trained ML model;
determine one or more reason codes for the applications based at least in part on the second score;
determine one or more actions for the applications based at least in part on the second score; and
provide the second score, the one or more reason codes, and the one or more actions to the dealer user device or a lender user device.

8. The non-transitory computer-readable storage medium of claim 7, wherein the character strings associated with each application comprise a first dealer user name and a second dealer user name, and wherein determining a common dealer comprising aggregating the application data relating to the common dealer, the identifying further comprising:
providing the aggregated application data as input to the second trained ML model.

9. The non-transitory computer-readable storage medium of claim 7, wherein the second score is based at least in part on a historical features for the applications associated with the dealer user device.

10. The non-transitory computer-readable storage medium of claim 7, wherein the one or more input features correspond with one or more weights, and the one or more processors are further configured to:
adjust the one or more weights of the one or more input features based at least in part on a comparison to a current time, wherein more recent features have greater weight than less recent features.

11. The non-transitory computer-readable storage medium of claim 7, wherein the one or more processors are further configured to:
determine a risk profile;
compare the risk profile to the application data; and
upon identifying a similarity feature between the risk profile and the application data, submit the similarity feature to the second trained ML model.

12. The non-transitory computer-readable storage medium of claim 7, wherein the first ML model is trained using a training data set of historical application data.

13. A system comprising:
one or more processors; and
a non-transitory computer-readable medium including instructions that, when executed by the one or more processors, cause the one or more processors to:
receive an application for loan from each of a plurality borrowers via at least one of a plurality of borrower user devices, each application comprising application data;
generate features from the applications for each of the borrowers;
generate with a first machine learning ("ML") model a score characterizing a lending risk for each of the plurality of borrowers, wherein the first ML model is iteratively trained with adjusted weight input features;
identify applications and scores from the first ML model associated with a common dealer user device, wherein identifying comprises:
normalizing character strings associated with each application and identifying the dealer user device;
generating a modified character string for each of the applications, wherein generating a modified character string comprises removing characters forming generic words from the normalized character string;
generating clusters of the modified character strings; and
determining a common dealer for a set of applications based on a field distance between fields of a plurality of clusters;
receive the plurality of scores for the set of applications for a common dealer, wherein the applications are exchanged between the plurality of borrower user devices and a dealer user device;
generate one or more input features associated with the applications;
determine a second score associated with the plurality of scores, wherein the second score corresponds with a collective risk associated with the dealer user device, and wherein determining the second score comprises applying the one or more input features and the plurality of scores associated with the applications to a second trained ML model;
determine one or more reason codes for the applications based at least in part on the second score;
determine one or more actions for the applications based at least in part on the second score; and provide the second score, the one or more reason codes, and the one or more actions to the dealer user device or a lender user device.

14. The system of claim 13, wherein the character strings associated with each application comprise a first dealer user name and a second dealer user name, and wherein determining a common dealer comprising aggregating the application data relating to the common dealer, the identifying further comprising:
  providing the aggregated application data as input to the second trained ML model.

15. The system of claim 13, wherein the second score is based at least in part on a historical features for the applications associated with the dealer user device.

16. The system of claim 13, wherein the one or more input features correspond with one or more weights, and the one or more processors are further configured to:
  adjust the one or more weights of the one or more input features based at least in part on a comparison to a current time, wherein more recent features have greater weight than less recent features.

17. The system of claim 13, wherein the one or more processors are further configured to:
  determine a risk profile;
  compare the risk profile to the application data; and
  upon identifying a similarity feature between the risk profile and the application data, submit the similarity feature to the second trained ML model.

18. The system of claim 13, wherein the first ML model is trained using a training data set of historical application data.

* * * * *